US012537340B2

(12) United States Patent
Yang et al.

(10) Patent No.: US 12,537,340 B2
(45) Date of Patent: Jan. 27, 2026

(54) HIGH-DENSITY ELECTRICAL CONNECTOR

(71) Applicant: ATL Technology, LLC, Springville, UT (US)

(72) Inventors: Tyler Yang, Provo, UT (US); Darrell Goff, Highland, UT (US); Braden Ta'ala, Spanish Fork, UT (US); John Holloway, Fort Myers, FL (US)

(73) Assignee: ATL TECHNOLOGY, LLC, Springville, UT (US)

(*) Notice: Subject to any disclaimer, the term of this patent is extended or adjusted under 35 U.S.C. 154(b) by 243 days.

(21) Appl. No.: 18/466,816

(22) Filed: Sep. 13, 2023

(65) Prior Publication Data

US 2024/0088609 A1 Mar. 14, 2024

Related U.S. Application Data

(60) Provisional application No. 63/424,713, filed on Nov. 11, 2022, provisional application No. 63/406,184, filed on Sep. 13, 2022.

(51) Int. Cl.
*H01R 13/627* (2006.01)
*H01R 13/518* (2006.01)
(Continued)

(52) U.S. Cl.
CPC ....... *H01R 13/6277* (2013.01); *H01R 13/518* (2013.01); *H01R 24/28* (2013.01); *H01R 24/86* (2013.01)

(58) Field of Classification Search
CPC .............. H01R 13/6277; H01R 13/518; H01R 24/28; H01R 24/86; H01R 12/778
See application file for complete search history.

(56) References Cited

U.S. PATENT DOCUMENTS 2,396,725 A 3/1946 Thomas, Jr.
3,718,859 A 2/1973 Arlow
(Continued)

FOREIGN PATENT DOCUMENTS

CN 204333521 U 5/2015
CN 205335533 U 6/2016
(Continued)

OTHER PUBLICATIONS

Extended European Search Report for EP Patent Application No. 25185677.9 dated Nov. 21, 2025.

*Primary Examiner* — Briggitte R. Hammond
(74) *Attorney, Agent, or Firm* — Kunzler Bean & Adamson

(57) ABSTRACT

An electrical connector. The electrical connector includes a plug. The plug includes a plug frame and plug ring-segment assemblies. The plug frame includes plug apertures. Each one of the plug ring-segment assemblies includes a plug ring-segment and a plurality of plug electrical contacts. The electrical connector further includes a receptacle. The receptacle includes a receptacle frame and receptacle ring-segment assemblies. The receptacle frame includes receptacle apertures. Each of the receptacle ring-segment assemblies includes a receptacle ring-segment and a plurality of receptacle electrical contacts. The plug is selectively connectable with the receptacle. When the plug is selectively connected to the receptacle, each one of at least some of the plug electrical contacts is in physical contact with a corresponding one of the receptacle electrical contacts.

20 Claims, 23 Drawing Sheets

(51) Int. Cl.
*H01R 24/28* (2011.01)
*H01R 24/86* (2011.01)

(56) References Cited

U.S. PATENT DOCUMENTS

| | | | | |
|---|---|---|---|---|
| 3,853,376 | A | 12/1974 | Marechal | |
| 5,026,300 | A | 6/1991 | Varner | |
| 5,181,859 | A | 1/1993 | Foreman | |
| 5,348,498 | A | 9/1994 | Morello | |
| 5,568,348 | A | 10/1996 | Foreman | |
| 5,632,655 | A | 5/1997 | Demarco, Jr. | |
| 5,953,815 | A | 9/1999 | Kaminski | |
| 5,993,242 | A | 11/1999 | Zell | |
| 6,652,319 | B1 | 11/2003 | Billman | |
| 7,914,344 | B2 | 3/2011 | Tin | |
| 7,922,529 | B1 | 4/2011 | Meurer | |
| 9,966,713 | B1 * | 5/2018 | Shaeffer | H01R 24/86 |
| 10,856,416 | B2 | 12/2020 | Rasmussen | |
| 10,931,069 | B2 | 2/2021 | Kunz | |
| 11,381,033 | B2 * | 7/2022 | Johnson | H01R 13/506 |
| 2020/0260582 | A1 * | 8/2020 | Rasmussen | H05K 3/326 |
| 2024/0088609 | A1 | 3/2024 | Yang et al. | |
| 2025/0007225 | A1 | 1/2025 | Yang et al. | |

FOREIGN PATENT DOCUMENTS

| | | |
|---|---|---|
| GB | 1239070 | 7/1971 |
| JP | 5109435 | 4/1993 |

* cited by examiner

HIGH-DENSITY ELECTRICAL CONNECTOR

CROSS-REFERENCE TO RELATED APPLICATIONS

This application claims the benefit of U.S. Provisional Patent Application Nos. 63/406,184, filed Sep. 13, 2022, and 63/424,713, filed Nov. 11, 2022, each of which is incorporated herein by reference in its entirety.

FIELD

This application relates generally to electrical components, and more specifically to an electrical connector having a plug and a receptacle.

BACKGROUND

Conventional high-density electrical connectors include rows of stacked electrical contact boards. Because any one of the boards may unpredictably act as a primary datum, as a plug of the connector is inserted into a receptacle of the connector, misalignment of or unreliable connections between the other of the boards may occur. Accordingly, predictably aligning multiple groupings of electrical contacts in a high-density electrical connector can be difficult. Moreover, manufacturing and assembling high-density electrical connectors in an efficient, predictable, and practical manner is hard to achieve.

SUMMARY

The subject matter of the present application has been developed in response to the present state of the art, and in particular, in response to the problems and needs of conventional devices or products for providing a high-density electrical connection between a tool and a tool control system that have not yet been fully solved. The subject matter of the present application has been developed to provide an electrical connector that facilitates a high-density electrical connection that overcomes many of the shortcomings of the prior art.

Disclosed herein is an electrical connector that includes a plug. The plug includes a plug frame that has plug apertures circumferentially spaced apart from each other and having a first arc shape. The plug also includes plug ring-segment assemblies, circumferentially spaced relative to each other and each attached to the plug frame within a corresponding one of the plug apertures. Each one of the plug ring-segment assemblies includes a plug ring-segment, having a second arc shape, and a plurality of plug electrical contacts, electrically isolated from each other, passing through the plug ring-segment, and arranged in a third arc shape. The plug also includes a receptacle that includes a receptacle frame, including receptacle apertures circumferentially spaced apart from each other and having a fourth arc shape, and receptacle ring-segment assemblies, circumferentially spaced relative to each other and each attached to the receptacle frame within a corresponding one of the receptacle apertures. Each one of the receptacle ring-segment assemblies includes a receptacle ring-segment, having a fifth arc shape, and a plurality of receptacle electrical contacts, electrically isolated from each other, passing through the receptacle ring-segment, and arranged in a sixth arc shape. The plug is selectively connectable with the receptacle. When the plug is selectively connected with the receptacle, each one of at least some of the plug electrical contacts is in physical contact with a corresponding one of the receptacle electrical contacts. The preceding subject matter of this paragraph characterizes example 1 of the present disclosure.

One of a first end of each one of the at least some of the plug electrical contacts is allowed to flex radially in an inward radial direction with respect to a second end of the corresponding one of the at least some of the plug electrical contacts, and the receptacle electrical contacts are prevented from flexing radially in the inward radial direction, or a first end of each one of the at least some of the receptacle electrical contacts is allowed to flex radially in the inward radial direction with respect to a second end of the corresponding one of the at least some of the receptacle electrical contacts, and the plug electrical contacts are prevented from flexing radially in the inward radial direction. The preceding subject matter of this paragraph characterizes example 2 of the present disclosure, wherein example 2 also includes the subject matter according to example 1, above.

One of at least one of the plurality of plug electrical contacts is radially movable toward and away from a central axis of the plug, or at least one of the plurality of receptacle electrical contacts is radially movable toward and away from a central axis of the receptacle. The preceding subject matter of this paragraph characterizes example 3 of the present disclosure, wherein example 3 also includes the subject matter according to any of examples 1-2, above.

The electrical connector further includes first flexible electrical circuit boards each comprising a first end in electrical contact with at least one of the plug electrical contacts of a corresponding one of the plug ring-segment assemblies and second flexible electrical circuit boards each comprising a first end in electrical contact with at least one of the receptacle electrical contacts of a corresponding one of the receptacle ring-segment assemblies. The preceding subject matter of this paragraph characterizes example 4 of the present disclosure, wherein example 4 also includes the subject matter according to any of examples 1-3, above.

The first end of each one of the first flexible electrical circuit boards in electrical contact with at least one of the plug electrical contacts is arced. Each one of the first flexible electrical circuit boards in electrical contact with at least one of the plug electrical contacts includes a second end that is opposite the first end and is flat. The first end of each one of the second flexible electrical circuit boards in electrical contact with at least one of the receptacle electrical contacts is arced. Each one of the second flexible electrical circuit boards in electrical contact with at least one of the receptacle electrical contacts comprises a second end that is opposite the first end, of the second flexible circuit board, and is flat. The preceding subject matter of this paragraph characterizes example 5 of the present disclosure, wherein example 5 also includes the subject matter according to example 4, above.

Any one of the plug ring-segment assemblies is attachable to the plug frame within the corresponding one of the plug apertures independently of attachment of any other one of the plug ring-segment assemblies to the plug frame within the corresponding one of the plug apertures. Any one of the receptacle ring-segment assemblies is attachable to the receptacle frame within the corresponding one of the receptacle apertures independently of attachment of any other one of the receptacle ring-segment assemblies to the receptacle frame within the corresponding one of the receptacle apertures. The preceding subject matter of this paragraph characterizes example 6 of the present disclosure, wherein example 6 also includes the subject matter according to any of examples 1-5, above.

Further disclosed herein is a plug of an electrical connector. The plug includes a plug frame that has apertures circumferentially spaced apart from each other and having a first arc shape. Each of the apertures are concentric relative to each other and to a central axis of the plug frame. The plug also includes ring-segment assemblies, circumferentially spaced relative to each other and each attached to the plug frame within a corresponding one of the apertures. Each one of the ring-segment assemblies includes a ring-segment, having a second arc shape, and a plurality of plug electrical contacts, electrically isolated from each other, passing through the ring-segment, and arranged in a third arc shape. The preceding subject matter of this paragraph characterizes example 7 of the present disclosure.

The plug frame includes plug-frame ribs and plug-frame slots adjacent to the apertures. Each ring-segment assembly includes ring-segment ribs and ring-segment slots. Each of the ring-segment ribs and the ring-segment slots are aligned with a corresponding one of the plug-frame ribs and the plug-frame slots, respectively. The preceding subject matter of this paragraph characterizes example 8 of the present disclosure, wherein example 8 also includes the subject matter according to example 7, above.

Each one of the plug electrical contacts is radially movable within a corresponding one of the plug-frame slots and radially movable within a corresponding one of the ring-segment slots with respect to a central axis of the plug frame. Each one of the plug electrical contacts is prevented from lateral movement within the corresponding one of the plug-frame slots and the corresponding one of the ring-segment slots with respect to the central axis of the plug frame. The preceding subject matter of this paragraph characterizes example 9 of the present disclosure, wherein example 9 also includes the subject matter according to example 8, above.

The plug frame further includes an outer ring, a middle ring, radially inwardly spaced apart from the outer ring, and an inner ring, radially inwardly spaced apart from the middle ring. The outer ring, the middle ring, the inner ring, and the apertures are concentric. Each one of the apertures is defined by a space either between the outer ring and the middle ring, or between the middle ring and the inner ring. The preceding subject matter of this paragraph characterizes example 10 of the present disclosure, wherein example 10 also includes the subject matter according to any of examples 7-9, above.

At least two of the apertures are defined by the space between the outer ring and the middle ring. At least two of the apertures are defined by the space between the middle ring and the inner ring. The preceding subject matter of this paragraph characterizes example 11 of the present disclosure, wherein example 11 also includes the subject matter according to example 10, above.

The plug frame further comprises spokes extending radially away from a central axis of the plug frame and coupling together the outer ring, the middle ring, and the inner ring. The preceding subject matter of this paragraph characterizes example 12 of the present disclosure, wherein example 12 also includes the subject matter according to example 11, above.

Each one of the apertures is defined between a corresponding two of the spokes. The preceding subject matter of this paragraph characterizes example 13 of the present disclosure, wherein example 13 also includes the subject matter according to example 12, above.

The plug further includes flexible electrical circuit boards each including a first end in electrical contact with at least one of the plug electrical contacts of a corresponding one of the ring-segment assemblies. The first end of each one of the flexible electrical circuit boards in electrical contact with at least one of the plug electrical contacts is arced. Each one of the flexible electrical circuit boards in electrical contact with at least one of the plug electrical contacts comprises a second end that is opposite the first end and is flat. The preceding subject matter of this paragraph characterizes example 14 of the present disclosure, wherein example 14 also includes the subject matter according to any of examples 7-13, above.

Additionally disclosed herein is a receptacle of an electrical connector. The receptacle includes a receptacle frame, comprising apertures circumferentially spaced apart from each other and having a first arc shape. Each of the apertures are concentric relative to each other and to a central axis of the receptacle frame. The receptacle also includes ring-segment assemblies, circumferentially spaced relative to each other and each attached to the receptacle frame within a corresponding one of the apertures. Each one of the ring-segment assemblies includes a ring-segment, having a second arc shape, and a plurality of receptacle electrical contacts, electrically isolated from each other, passing through the ring-segment, and arranged in a third arc shape. The preceding subject matter of this paragraph characterizes example 15 of the present disclosure.

The receptacle further includes flexible electrical circuit boards each having a first end in electrical contact with at least one of the receptacle electrical contacts of a corresponding one of the ring-segment assemblies. The first end of each one of the flexible electrical circuit boards in electrical contact with at least one of the receptacle electrical contacts is arced. Each one of the flexible electrical circuit boards in electrical contact with at least one of the receptacle electrical contacts includes a second end that is opposite the first end and is flat. The preceding subject matter of this paragraph characterizes example 16 of the present disclosure, wherein example 16 also includes the subject matter according to example 15, above.

The receptacle frame further includes an outer ring, a middle ring, radially inwardly spaced apart from the outer ring, and an inner ring, radially inwardly spaced apart from the middle ring. The outer ring, the middle ring, the inner ring, and the apertures are concentric. Each one of the apertures is defined by a space either between the outer ring and the middle ring, or between the middle ring and the inner ring. The preceding subject matter of this paragraph characterizes example 17 of the present disclosure, wherein example 17 also includes the subject matter according to any of examples 15-16, above.

At least two of the apertures are defined by the space between the outer ring and the middle ring. At least two of the apertures are defined by the space between the middle ring and the inner ring. The preceding subject matter of this paragraph characterizes example 18 of the present disclosure, wherein example 18 also includes the subject matter according to example 17, above.

The receptacle frame further includes spokes extending radially away from a central axis of the receptacle frame and coupling together the outer ring, the middle ring, and the inner ring. The preceding subject matter of this paragraph characterizes example 19 of the present disclosure, wherein example 19 also includes the subject matter according to example 18, above.

Each one of the apertures is defined between a corresponding two of the spokes. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 6:
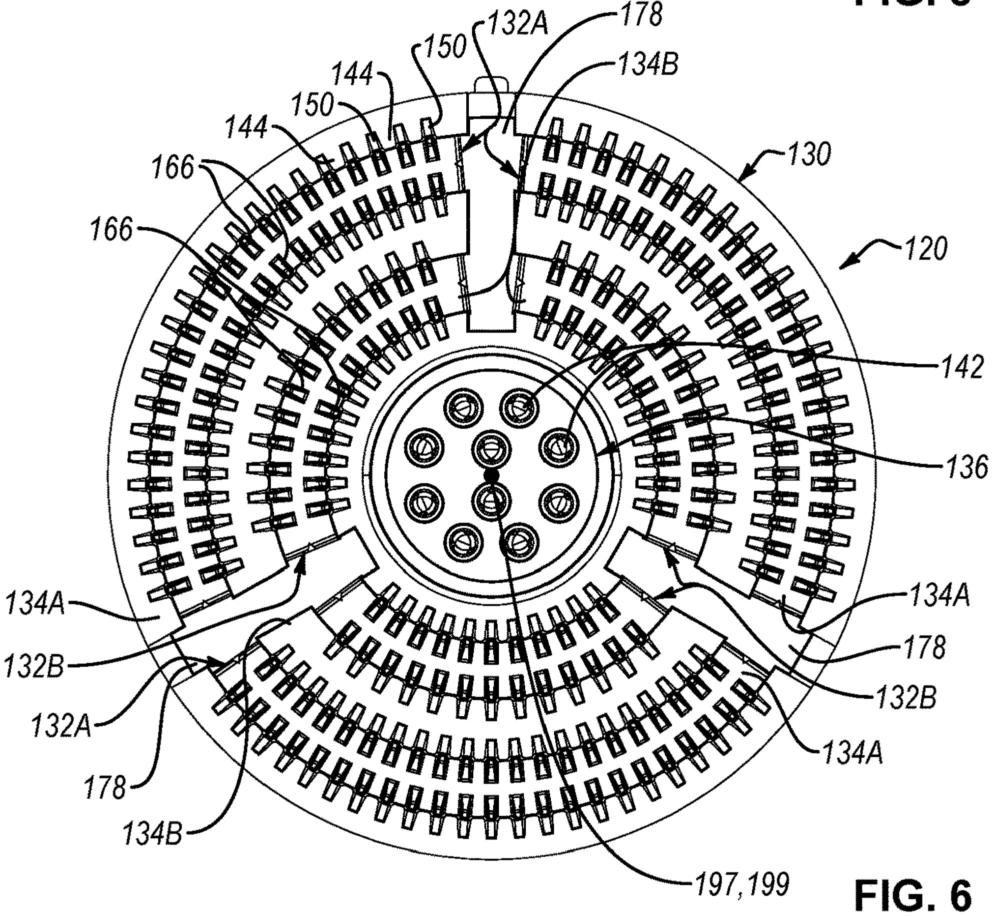
FIG. 6 illustrates a front, elevation view of a plug contact carrier of the plug of FIG. 3, according to one or more examples of the present disclosure.
Figure 8:
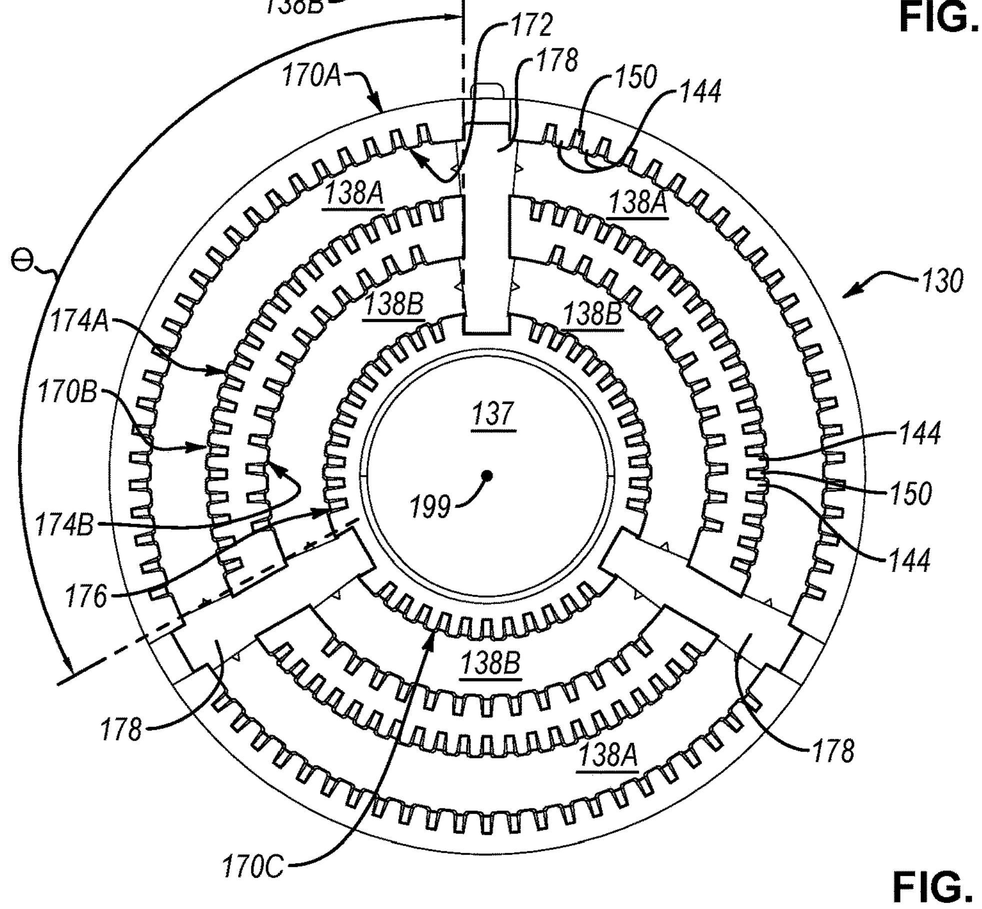
FIG. 8 illustrates a front elevation view of a plug frame of the plug contact carrier of FIG. 5, according to one or more examples of the present disclosure.
Figure 9:
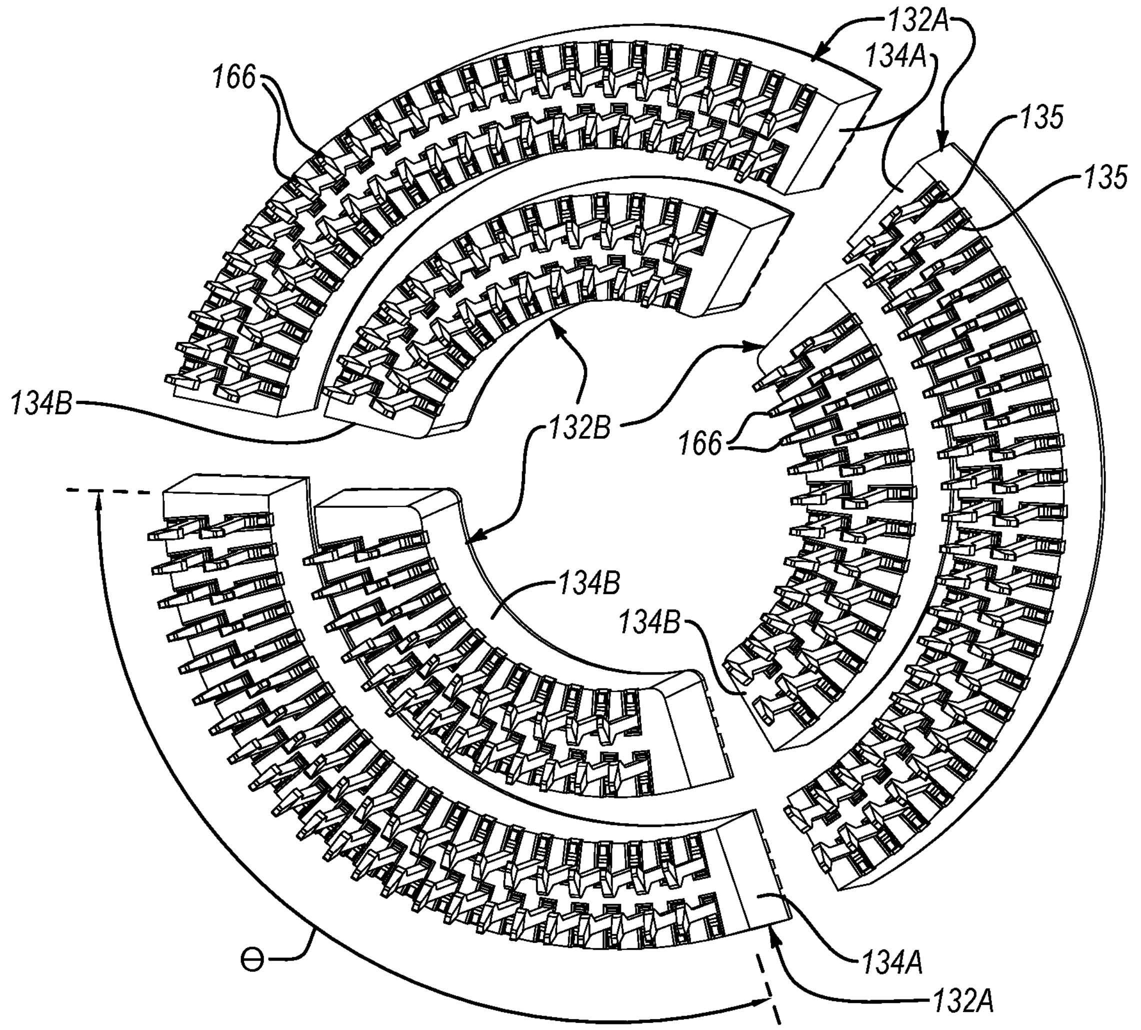
FIG. 9 illustrates a forward, perspective view of outer and inner ring-segment assemblies of the contact carrier of FIG. 5, according to one or more examples of the present disclosure.
Figure 10:
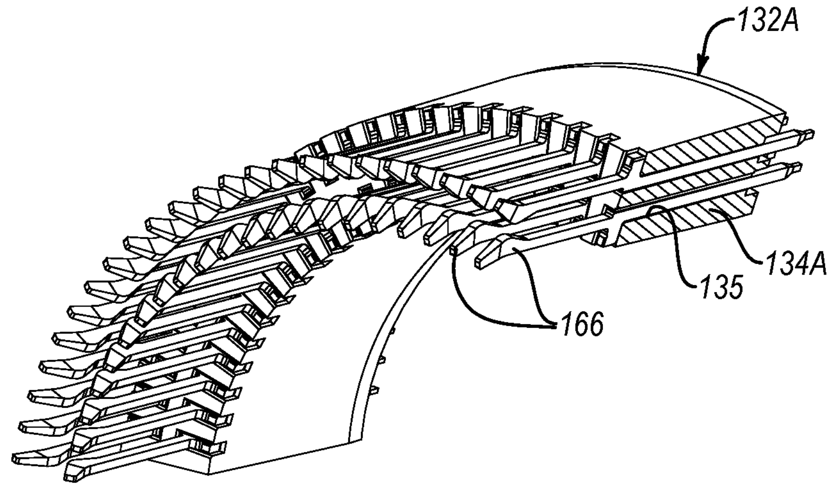
FIG. 10 illustrates a forward, perspective view of an outer ring-segment assembly of the plug contact carrier of FIG. 5, according to one or more examples of the present disclosure.
Figure 23:
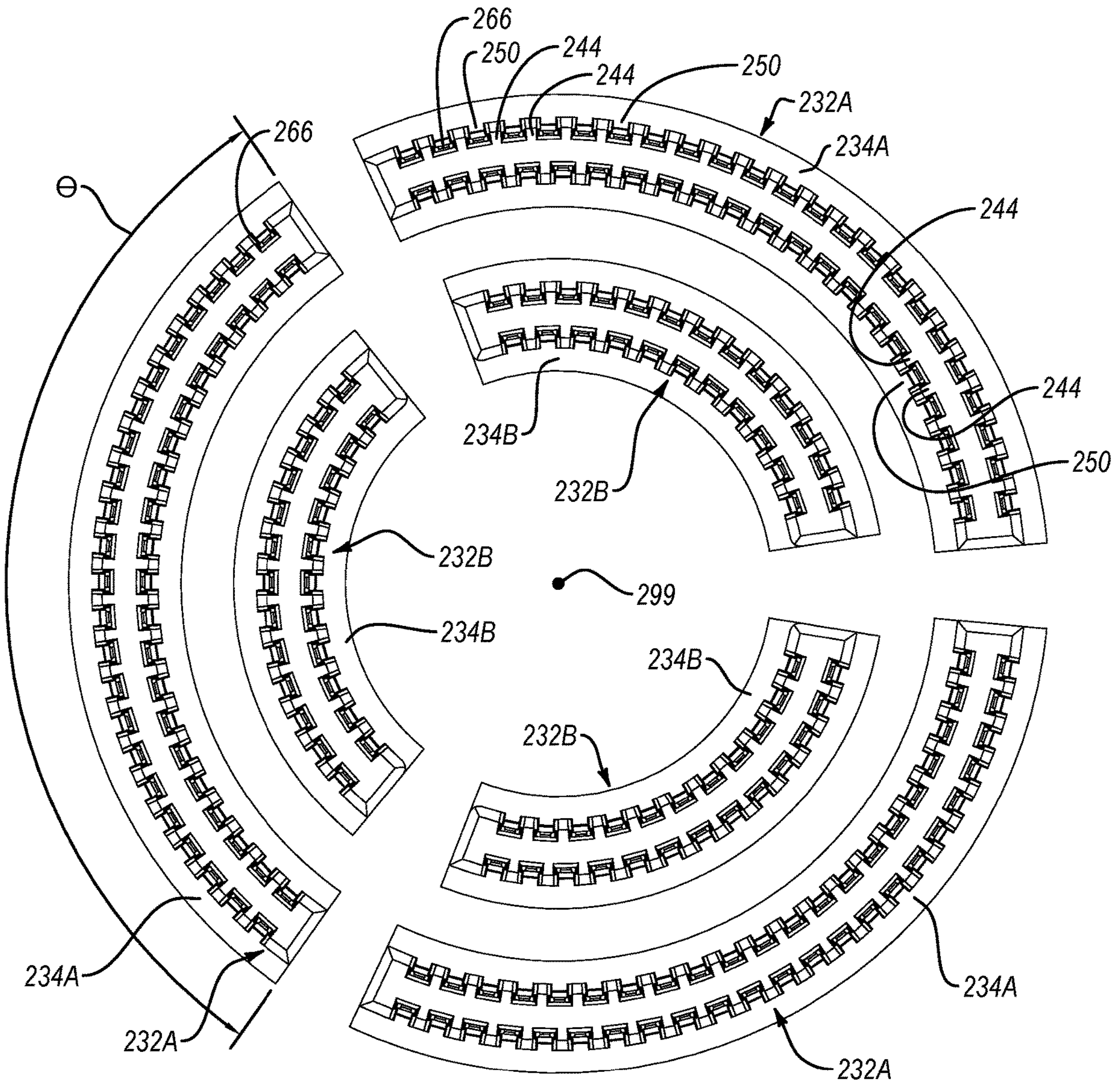
FIG. 23 illustrates a front elevation view of the outer and inner ring-segment assemblies of FIG. 21, according to one or more examples of the present disclosure.

Referring to FIG. 1, one embodiment of an electrical connector 100 includes a plug 102 and a receptacle 104. The electrical connector 100 is considered a high-density electrical connector because the electrical connector 100 has a high density of electrical contacts, terminals, or couplings each configured to transmit electrical signals, or other signals, between the plug 102 and the receptacle 104 when connected. Generally, when the plug 102 and the receptacle 104 are connected together, the majority of the electrical contacts of the electrical connector 100 are arranged in multiple, separated arc segments about a common axis (e.g., a central axis 195 the electrical connector 100, as shown in FIGS. 6, 8, and 23). Coaxial and rotational alignment of the plug 102 and the receptacle 104 ensures proper alignment of corresponding electrical contacts of the plug 102 and the receptacle 104. Moreover, coaxial and rotational alignment of the plug 102 and the receptacle 104 is based on initial alignment of a single, predictable primary datum independent of the electrical contacts. Such a configuration is advantageous over conventional high-density electrical connectors with rows of stacked electrical contact boards because any one of the boards may unpredictably act as the primary datum, which may result in a misalignment of or unreliable connections between the other of the boards.

The plug 102 includes a housing 110 and flexible circuit boards 300 extending from the housing 110. The flexible circuit boards 300 may include electrical traces imprinted on or embedded within an electrically-insulating substrate. In some implementations, the flexible circuit boards 300 can be replaced with rigid or non-flexible circuit boards circuit boards 106 can be flexible circuit boards. Each flexible circuit board 300 is electrically coupled to one or more electrical contacts of the plug 102 at one end and other electrical connections (not shown), such as those of a medical tool or medical equipment, at an opposite end. The housing 110 includes an engagement end portion 116 with a reduced outer peripheral diameter relative to the rest of the housing 110, which facilitates insertion of the engagement end portion 116 into the receptacle 104. The engagement end portion 116 can include alignment apertures and retention apertures spaced apart about the periphery of the engagement end portion 116. The housing 110 defines an interior cavity, which can be accessible through the alignment apertures and the retention apertures.

Figure 2:
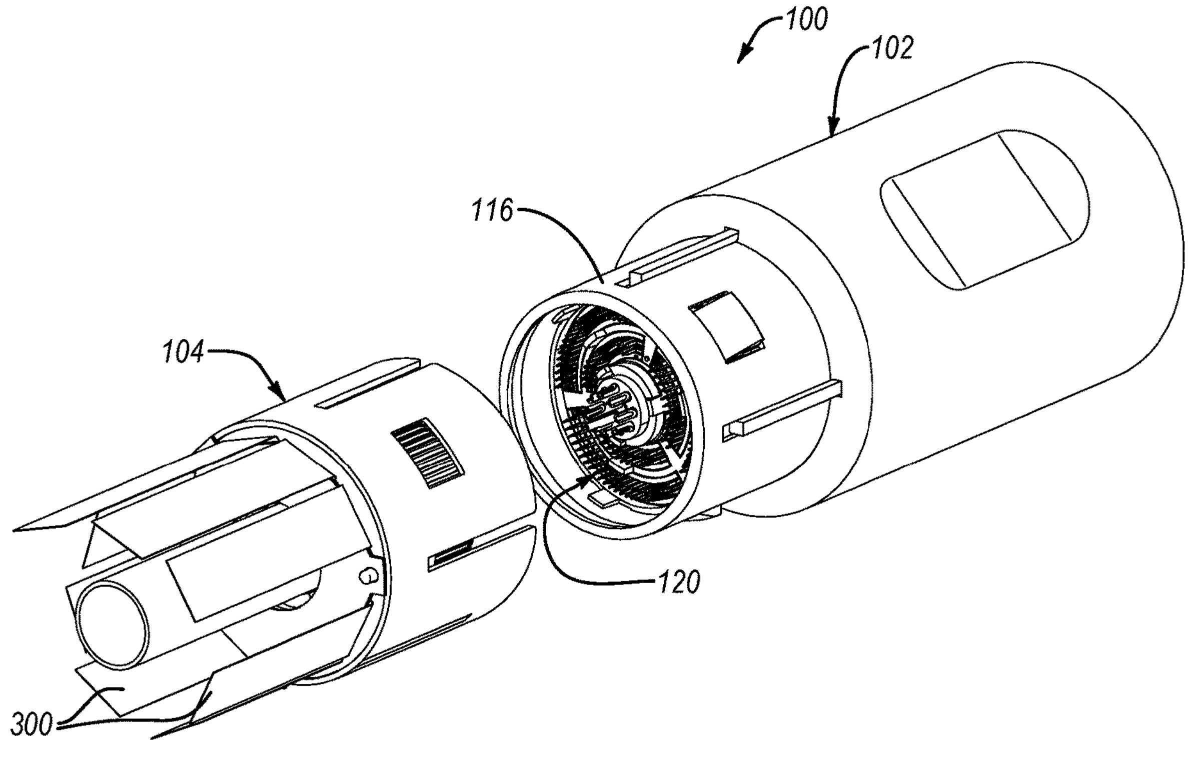
FIG. 2 illustrates a perspective view of an electrical connector, shown with a plug of the electrical connector disconnected from a receptacle of the electrical connector, according to one or more examples of the present disclosure.
Figure 3:
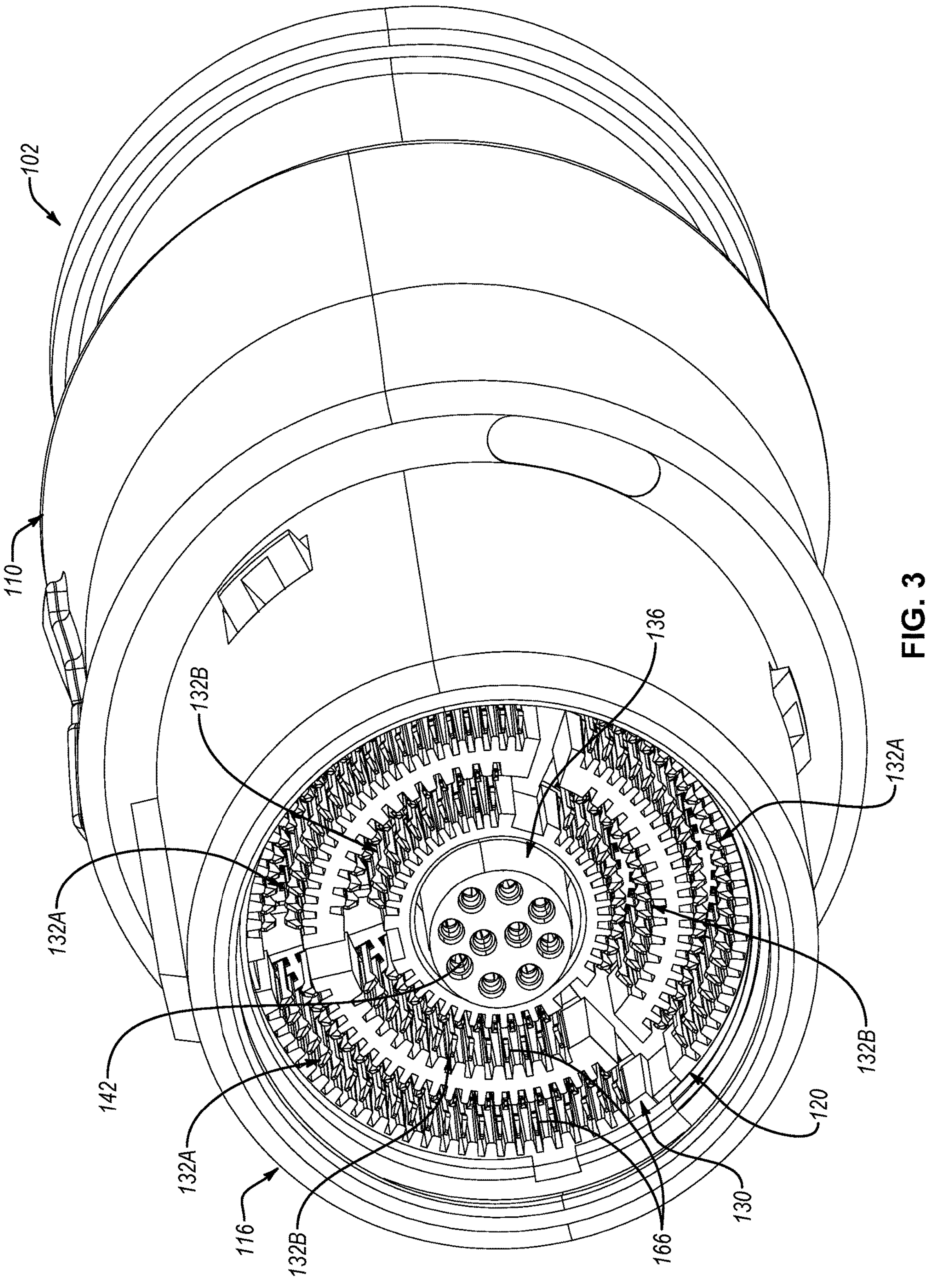
FIG. 3 illustrates a forward, perspective view of a plug of an electrical connector, according to one or more examples of the present disclosure.
Figure 4:
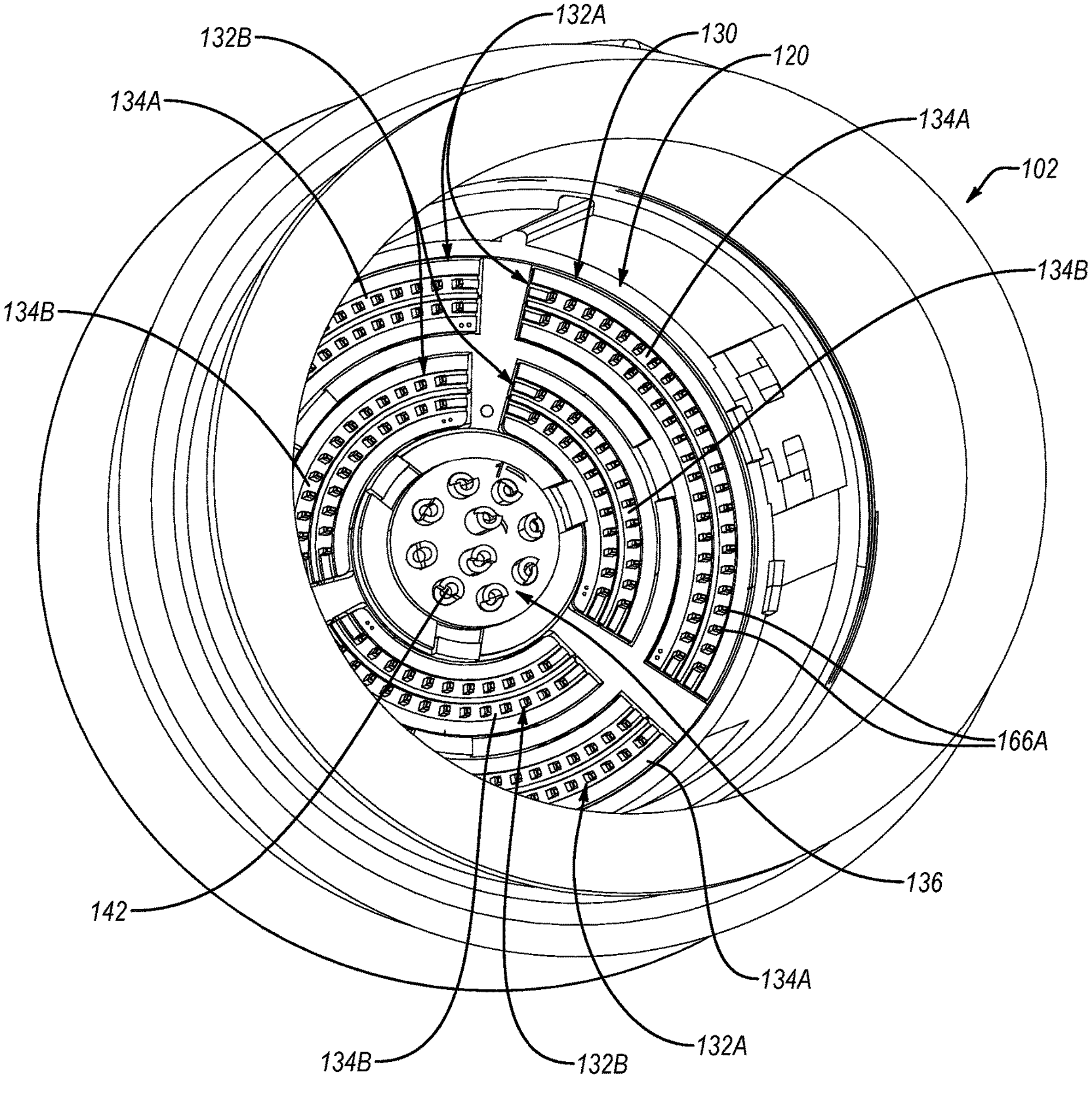
FIG. 4 illustrates a rearward, perspective view of the plug of FIG. 3, according to one or more examples of the present disclosure.

Referring to FIGS. 2-4, the plug 102 further includes a plug contact carrier 120 housed within the interior cavity of the housing 110 at the engagement end portion 116. The engagement end portion 116 retains the plug contact carrier 120. In some examples, the engagement end portion 116 enables the plug contact carrier 120 to translationally shift along the central axis 195.

Figure 5:
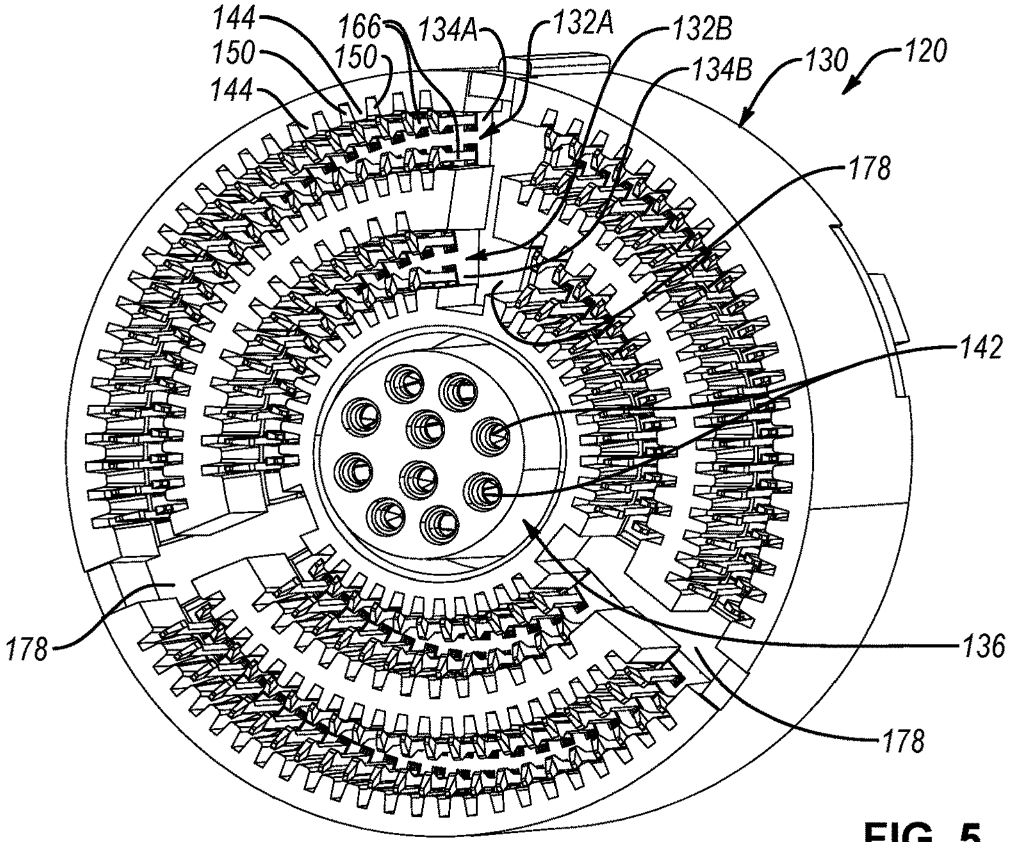
FIG. 5 illustrates a forward, perspective view of a plug contact carrier of the plug of FIG. 3, according to one or more examples of the present disclosure.

As shown in FIGS. 5 and 6, the plug contact carrier 120 includes a plug frame 130, outer ring-segment assemblies 132A, inner ring-segment assemblies 132B, and a plug central insert 136. The outer ring-segment assemblies 132A, the inner ring-segment assemblies 132B, and the plug central insert 136 are coupled with and retained by the plug frame 130. Accordingly, the outer ring-segment assemblies 132A, the inner ring-segment assemblies 132B, and the plug central insert 136 are formed or assembled separately from that of the plug frame 130 and subsequently coupled with (e.g., attached to) plug frame 130.

Each one of the outer ring-segment assemblies 132A and the inner ring-segment assemblies 132B includes plug electrical contacts 166. Additionally, the plug central insert 136 includes couplings 142, which can be electrical contacts, fluidic couplings, pneumatic couplings, fiber-optic couplings, and the like. In some examples, one or more of the couplings 142 includes a multi-axial coupling, such as a coaxial coupling, a triaxial coupling, a quadraxial coupling, and the like. The couplings 142 of the plug central insert 136 are identical types of couplings in some examples. However, in other examples, one or more of the couplings 142 is a type of coupling that is different than another or others of the couplings 142. The plug central insert 136 has nine couplings 142 in the illustrated example. However, in other examples, the plug central insert 136 has fewer than nine couplings 142 (e.g., one to eight couplings 142) or more than nine couplings 142 (e.g., ten, eleven, twelve, eighteen, or more couplings 142).

Figure 7:
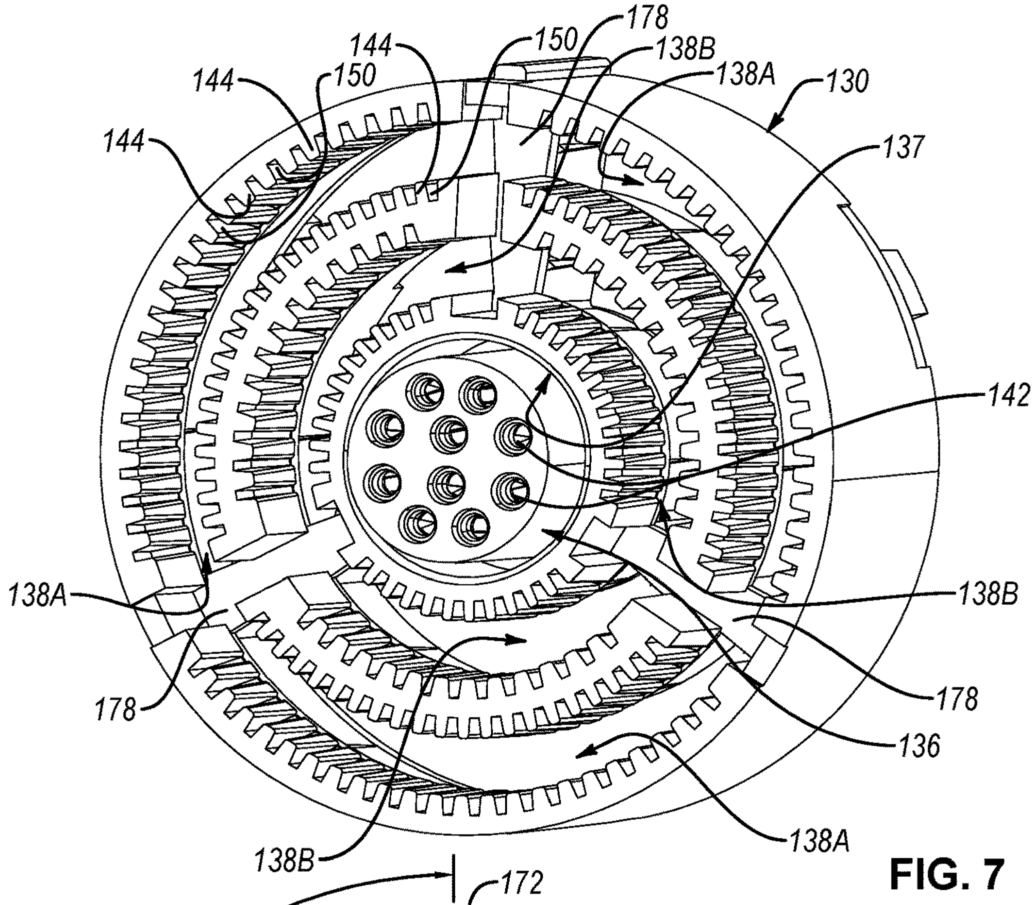
FIG. 7 illustrates a forward, perspective view of a plug frame of the plug contact carrier of FIG. 5, according to one or more examples of the present disclosure.

Referring now to FIGS. 7 and 8, the plug frame 130 includes multiple concentric and radially spaced-apart rings. In the illustrated example, the plug frame 130 includes three rings. More specifically, in the illustrated example, the plug frame 130 includes an outer ring 170A, a middle ring 170B, and an inner ring 170C. The outer ring 170A is radially outwardly spaced apart from the middle ring 170B, and the middle ring 170B is radially outwardly spaced apart from the inner ring 170C. In other words, the inner ring 170C is closer to the central axis 199 of the plug frame 130 than the middle ring 170B, and the middle ring 170B is closer to the central axis 199 of the plug frame 130 than the outer ring 170A. The plug frame 130 additionally includes spokes 178, perpendicular to the central axis 199 and extending radially away from the central axis 199. The spokes 178 are uniformly angularly spaced about the central axis 199. The spokes 178 couple together the outer ring 170A, the middle ring 170B, and the inner ring 170C.

The plug frame 130 also includes outer apertures 138A, inner apertures 138B, and a central aperture 137, which are concentric relative to each other and the central axis 199 of the plug frame 130. The apertures extend entirely through the plug frame 130 in a direction parallel to the central axis 199. Each one of the outer apertures 138A is defined between the outer ring 170A (e.g., a radially inward surface 172 of the outer ring 170A), the middle ring 170B (e.g., a radially outward surface 174A of the middle ring 170B), and an adjacent two of the spokes 178. Similarly, each one of the inner apertures 138B is defined between the middle ring 170B (e.g., a radially inward surface 174B of the middle ring 170B), the inner ring 170C (e.g., a radially outward surface 176 of the inner ring 170C), and an adjacent two of the spokes 178. In some examples, plug frame 130 has a one-piece unitary and continuous monolithic construction. In other words, in such examples, the outer ring 170A, the middle ring 170B, and the spokes 178 are co-formed (e.g., co-molded) together. In some examples, the plug frame 130 is made of an electrically non-conductive material. However, the plug frame 130 can be made of an electrically conductive material in certain examples.

Although, in the illustrated examples, the plug frame 130 includes three rings and two sets of apertures each between corresponding ones of the three rings, according to other examples, the plug frame 130 can have more than three rings (e.g., four, five, six, or more rings) that define three or more sets of apertures each between corresponding ones of the more than three rings. Additionally, in the illustrated examples, the plug contact carrier 120, including the plug frame 130, is formed separate from the housing 110 and coupled to the housing 110. However, in other examples, the plug frame 130 and the housing 110 are co-formed, and form a one-piece monolithic and seamless construction. In other words, in some examples, the plug frame 130 can function as a housing of the plug 102, or alternatively, a housing of the plug 102 can function as the plug frame 130.

The outer ring 170A, the middle ring 170B, and the inner ring 170C have a circular shape. Accordingly, each one of the outer apertures 138A and the inner apertures 138B has an arc shape or a semi-circular shape. Each one of the outer apertures 138A and the inner apertures 138B has an arc measure θ that is less than 360°. The arc measure θ of each one of the outer apertures 138A and the inner apertures 138B is dependent on the number and the width of the spokes 178. Moreover, the quantity of the outer apertures 138A and the inner apertures 138B is also dependent on the number and the width of the spokes 178. In the illustrated example, the plug frame 130 includes three spokes 178 such that the plug frame 130 also includes three outer apertures 138A and three inner apertures 138B (e.g., a total of six apertures). However, in other examples, the plug frame 130 includes two spokes 178 or more than three spokes 178 such that the plug frame 130 includes two, or more than three, outer apertures 138A and two, or more than three, inner apertures 138B. The widths of the spokes 178 can be the same so that the arc measure θ of each one of the outer apertures 138A is the same, and the arc measure θ of each one of the inner apertures 138B is the same. Moreover, in some examples, the width of the spokes 178 is such that the arc measure θ of each one of the outer apertures 138A and the inner apertures 138B is the same. However, in some examples, the arc measure θ of each one of the outer apertures 138A can be different from the arc measure θ of at least one other one of the outer apertures 138A, and the arc measure θ of each one of the inner apertures 138B can be different from the arc measure θ of at least one other one of the inner apertures 138B. In certain examples, the arc measure θ of each one of the outer apertures 138A and/or the inner apertures 138B is between, and inclusive of, 10° and 170°. In one example, the arc measure θ of each one of the outer apertures 138A and/or the inner apertures 138B is between, and inclusive of, 30° and 150°. In yet another example, the arc measure θ of each one of the outer apertures 138A and/or the inner apertures 138B is between, and inclusive of, 50° and 130° (e.g., between, and inclusive of, 55° and 65°).

Each one of the outer ring-segment assemblies 132A is located within and is fixed to a corresponding one of the outer apertures 138A of the plug frame 130. Similarly, each one of the inner ring-segment assemblies 132B is located within and fixed to a corresponding one of the inner apertures 138B of the plug frame 130. Accordingly, the quantity of the outer ring-segment assemblies 132A and the inner ring-segment assemblies 132B of the plug contact carrier 120 corresponds with the quantity of the outer apertures 138A and the inner apertures 138B, respectively. For example, in the illustrated implementations, the plug frame 130 includes three outer apertures 138A and three inner apertures 138B, such that there are three outer ring-segment assemblies 132A and three inner ring-segment assemblies 132B. However, in other examples, where the plug frame 130 includes one, two, or more than three, outer apertures 138A, and one, two, or more than three, inner apertures 138B, the plug contact carrier 120 includes one, two, or more than three, outer ring-segment assemblies 132A, and one, two, or more than three, inner ring-segment assemblies 132B.

When fitted within the inner apertures 138B, each one of the inner ring-segment assemblies 132B is circumferentially spaced apart from adjacent ones of the inner ring-segment assemblies 132B by a corresponding one of the spokes 178. Similarly, when fitted within the outer apertures 138A, each one of the outer ring-segment assemblies 132A is circumferentially spaced apart from adjacent ones of the outer ring-segment assemblies 132A by a corresponding one of the spokes 178. Accordingly, in some examples, when coupled to the plug frame 130, a gap is defined between adjacent ones of the outer ring-segment assemblies 132A and a gap is defined between adjacent ones of the inner ring-segment assemblies 132B. Each one of the spokes 178 can partially or entirely fill the gap between corresponding adjacent ones of the outer ring-segment assemblies 132A and corresponding adjacent ones of the inner ring-segment assemblies 132B.

However, in some examples, when fitted within the outer apertures 138A, each one of the outer ring-segment assemblies 132A contacts (e.g., abuts or adjoins) the adjacent ones of the outer ring-segment assemblies 132A. Similarly, when fitted within the inner apertures 138B, each one of the inner ring-segment assemblies 132B contacts (e.g., abuts or adjoins) the adjacent ones of the inner ring-segment assemblies 132B. Accordingly, in these examples, when coupled to the plug frame 130, there are at least portions where no gap is defined between adjacent ones of the outer ring-segment assemblies 132A and no gap is defined between adjacent ones of the inner ring-segment assemblies 132B. According to certain examples, the spokes 178 can be configured such that each one of the spokes 178 is only partially between corresponding adjacent ones of the outer ring-segment assemblies 132A and corresponding adjacent ones of the inner ring-segment assemblies 132B, and enables direct contact between at least portions of adjacent ones of the outer ring-segment assemblies 132A and adjacent ones of the inner ring-segment assemblies 132B.

The portions of the outer ring-segment assemblies 132A in contact with each other, and the portions of the inner ring-segment assemblies 132B in contact with each other, can merely frictionally engaged with each other, fastened to each other, or affixed to each other, such as via an adhesive, a glue, an epoxy, a braze, or a weld. In some examples, the outer ring-segment assemblies 132A and the inner ring-segment assemblies 132B are respectively assembled together (e.g., brought into contact with each other) before being inserted into the outer apertures 138A and the inner apertures 138B, respectively. For example, the outer ring-segment assemblies 132A can be affixed to each other, to form a unitary ring-shaped assembly, and the inner ring-segment assemblies 132B can be affixed to each other, to form a unitary ring-shaped assembly, before being inserted into the outer apertures 138A and the inner apertures 138B, respectively. In alternative examples, the outer ring-segment assemblies 132A come into contact with each other, and the inner ring-segment assemblies 132B come into contact with each other, as they are inserted into the outer apertures 138A and the inner apertures 138B, respectively.

Figure 11:
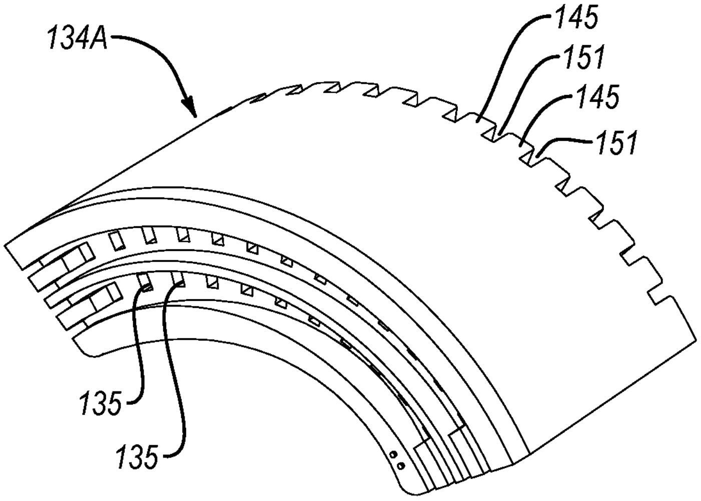
FIG. 11 illustrates a forward, perspective view of an outer ring segment of the outer ring-segment assembly of FIG. 10, according to one or more examples of the present disclosure.
Figure 12:
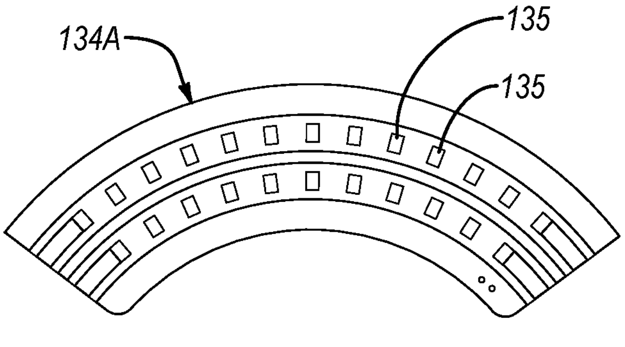
FIG. 12 illustrates a front elevation view of the outer ring-segment assembly of FIG. 10, according to one or more examples of the present disclosure.

Referring now to FIGS. 9-12, each one of the outer ring-segment assemblies 132A includes an outer ring segment 134A, and each one of the inner ring-segment assemblies 132B includes an inner ring segment 134B. As shown in FIGS. 11 and 12, each one of the outer ring segments 134A and the inner ring segments 134B has an arc shape or a semi-circular shape, and a plurality of contact apertures 135. The outer ring segments 134A and the inner ring segments 134B are made of an electrically non-conductive material (e.g., dielectric material). Each one of the contact apertures 135 is configured to receive and at least partially retain one of the plug electrical contacts 166. When received and retained in a contact aperture 135, a proximal portion of the plug electrical contact 166 protrudes from a forward side of the corresponding ring segment and a distal portion protrudes from a rearward side of the corresponding ring segment. For any one of the ring segments, such as the outer ring segment 134A shown in FIGS. 10-12, the contact apertures 135 are arranged in at least two concentric arc-shaped rows that are radially spaced apart from each other. The distance between the arc-shaped rows of contact apertures 135 corresponds to a desired distance, which is associated with a thickness of the corresponding one of the outer ring segments 134A or the inner ring segments 134B between the apertures 135. In this manner, the thickness of the outer ring segments 134A or the inner ring segments 134B between the contact apertures 135 acts as a dielectric for electrically isolating the contact apertures 135 from one another. The arc-shaped rows of the contact apertures 135 are concentric with the central axis 199, such that the plug electrical contacts 166 are also arranged in arc-shaped rows that are concentric with the central axis 199. Moreover, the arc-shaped rows of the plug electrical contacts 166 are separated by a gap equal to the desired distance.

In the illustrated examples, the rings of the plug frame 130 are circular, the apertures defined between the rings are arc-shaped or semi-circular-shaped, and the ring segments are arc-shaped or semi-circular-shaped. However, in other examples, the rings of the plug frame 130 can be non-circular, the apertures defined between the rings can be non-arc-shaped or non-semi-circular-shaped, and the ring segments can be non-arc-shaped or non-semi-circular-shaped. For example, in some implementations, the rings of the plug frame 130 are polygonal-shaped (e.g., hexagonal-shaped), the apertures defined between the rings are linear, and the ring segments are linear.

In some examples, each one of the outer ring segments 134A and the inner ring segments 134B forms a friction fit, press fit, or an interference fit with the corresponding one of the outer apertures 138A and the inner apertures 138B. In these or alternative examples, a bonding agent, such as an adhesive, glue, epoxy, and the like, can be applied between the ring segments and the surfaces of the plug frame 130 defining the corresponding apertures to help secure the ring segments to the plug frame 130. Because the outer ring-segment assemblies 132A and the inner ring-segment assemblies 132B can be individually assembled prior to attachment to the plug frame 130, the plug 102 can be assembled in a more efficient, timely, and reliable manner. Isolating the assembly of one ring-segment assembly relative to another ring-segment assembly promotes more space and control for handling, inserting, and retaining the plug electrical contacts 166 into the ring-segment assemblies. Moreover, inserting and coupling the ring-segment assemblies into the plug frame 130 independently of any other one of the ring-segment assemblies promotes ease and reliability when assembling the plug contact carrier 120. Furthermore, separating the forming of the plug frame 130 from the ring-segment assemblies reduces the complexity of the parts and thus the overarching molding process.

Referring to FIGS. 7 and 8, in some examples, the plug frame 130, and each one of the outer ring segments 134A and the inner ring segments 134B, includes ribs and slots, arranged in arc-shaped groupings, which enable compliance (e.g., resilient flexing) of the plug electrical contacts 166 as the plug 102 and the receptacle 104 are connected together. More specifically, the plug frame 130 includes ribs 144 and slots 150 formed in the radially inward surface 172 of the outer ring 170A, the radially outward surface 174A and the radially inward surface 174B of the middle ring 170B, and the radially outward surface 176 of the inner ring 170C. Each one of the slots 150 is defined between adjacent ones of the ribs 144. Corresponding with the ribs 144 and the slots 150 in the plug frame 130, as shown in FIG. 11, each one of the outer ring segments 134A and the inner ring segments 134B includes ribs 145 and slots 151. The ribs 154 and the slots 151 are positioned on the outer ring segments 134A and the inner ring segments 134B, so that when the outer ring-segment assemblies 132A and the inner ring-segment assemblies 132B are coupled with the plug frame 130, the ribs 145 and the slots 151 are aligned with corresponding ones of the ribs 144 and the slots 150.

The spacing of the ribs 144 and the ribs 145, and thus the width of the slots 150 and the slots 151, is selected to allow a corresponding plug electrical contact 166 to move, within corresponding ones of the slots 150 and slots 151, radially outward away from the central axis 199 and radially inward toward the central axis 199 and to prevent or restrict the corresponding plug electrical contact 166 from moving laterally in a circumferential direction. Accordingly, the plug electrical contacts 166 are allowed to flex radially while remaining within the slots 150 and the slots 151 and constrained in a fixed angular position, which promotes electrical isolation between the plug electrical contacts 166 and proper positioning for contacting receptacle electrical contacts 266 of the receptacle 104.

In some examples, the plug contact carrier 120 includes at least one hundred and twenty-eight plug electrical contacts 166, plus or minus 25%. In other examples, the plug contact carrier 120 includes at least one hundred and twenty-eight plug electrical contacts 166, plus or minus 25%. According to certain examples, the plug contact carrier 120 includes at least two hundred and fifty-six plug electrical contacts 166, plus or minus 25%. In some examples, each plug electrical contact 166 is configured to facilitate resilient flexing of a free end of the plug electrical contact 166 relative to a fixed end of the plug electrical contact, as described in U.S. Pat. No. 10,931,069, issued Feb. 23, 2021, which is incorporated herein by reference in its entirety. The plug electrical contacts 166 are made from an electrically conducting material, such as copper. Moreover, in one implementation, the plug electrical contacts 166 are made using a metal stamping process.

Figure 13:
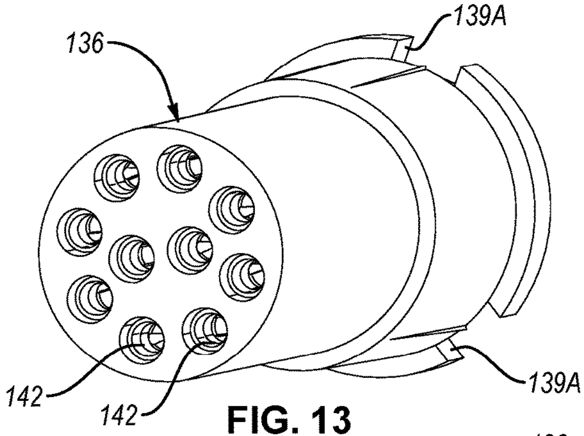
FIG. 13 illustrates a forward, perspective view of a center insert of the plug contact carrier of FIG. 5, according to one or more examples of the present disclosure.
Figure 14:
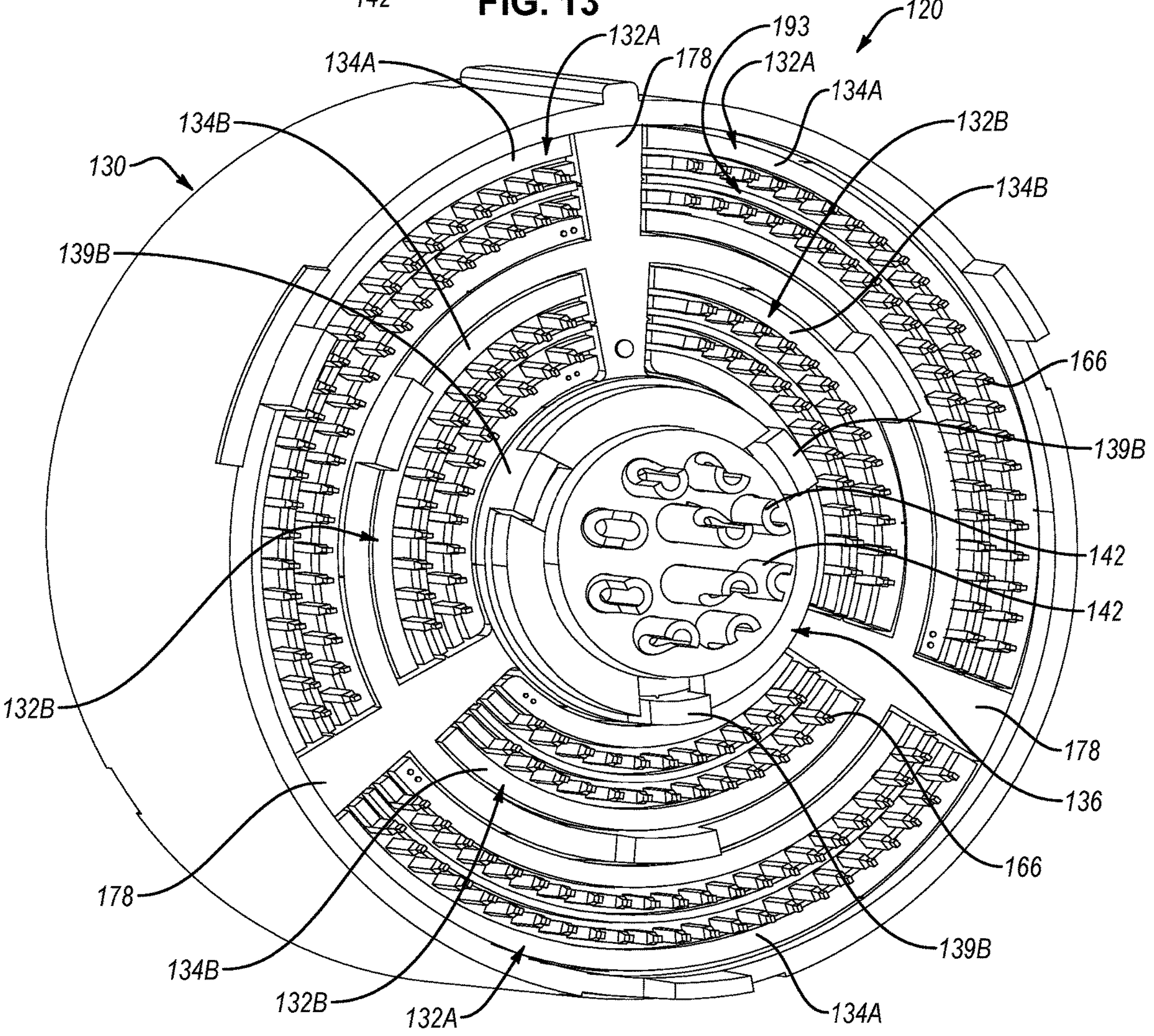
FIG. 14 illustrates a rearward, perspective view of the plug contact carrier of FIG. 5, according to one or more examples of the present disclosure.

Referring to FIGS. 13 and 14, the plug central insert 136 of the plug contact carrier 120 is coupled to and positioned within the central aperture 137 of the plug frame 130. The plug central insert 136 includes a housing that retains the couplings 142.

In some examples, the plug central insert 136 forms a friction fit or an interference fit with the central aperture 137. In these or alternative examples, a bonding agent, such as an adhesive, glue, epoxy, and the like, is applied between the plug central insert 136 and the surfaces of the plug frame 130 defining the central aperture 137 to help secure the plug central insert 136 to the plug frame 130. In certain examples, the plug central insert 136 includes keying features, such as slots 139A formed in a flange of the plug central insert 136. The keying features of the plug central insert 136 are configured to engage corresponding keying features, such as tabs 139B, of the plug frame 130. Engagement between the keying features of the plug central insert 136 and the plug frame 130 ensures the couplings 142 of the plug central insert 136 are properly positioned and orientated within the central aperture 137 relative to the position and orientation of the plug electrical contacts 166. In some examples, the plug central insert 136 can be interchangeable or reconfigurable with other plug central inserts to meet any of various interconnect capabilities, such as those demanded by a customer. For example, the plug central insert 136 can be non-removably fixed to or selectively removably coupled to the plug contact carrier 120. Interchangeability can be facilitated through the use of selectively releasable interlocking elements, such as clips, tabs, detents, etc., interference fit coupling, and/or any of various other like elements.

Figure 1A:
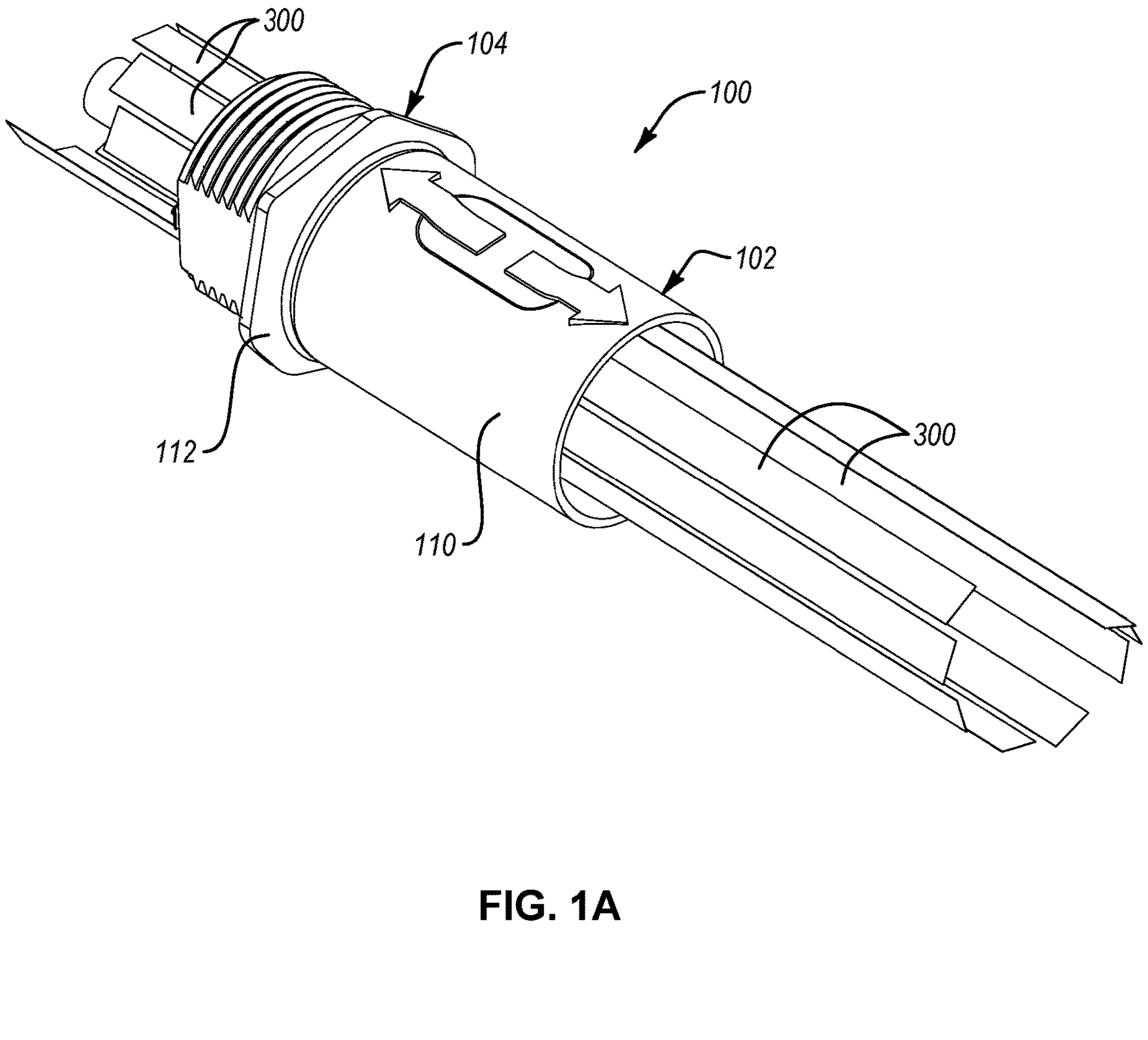
FIG. 1A illustrates a perspective view of an electrical connector, shown with a plug of the electrical connector connected to a receptacle of the electrical connector, according to one or more examples of the present disclosure.
Figure 1B:
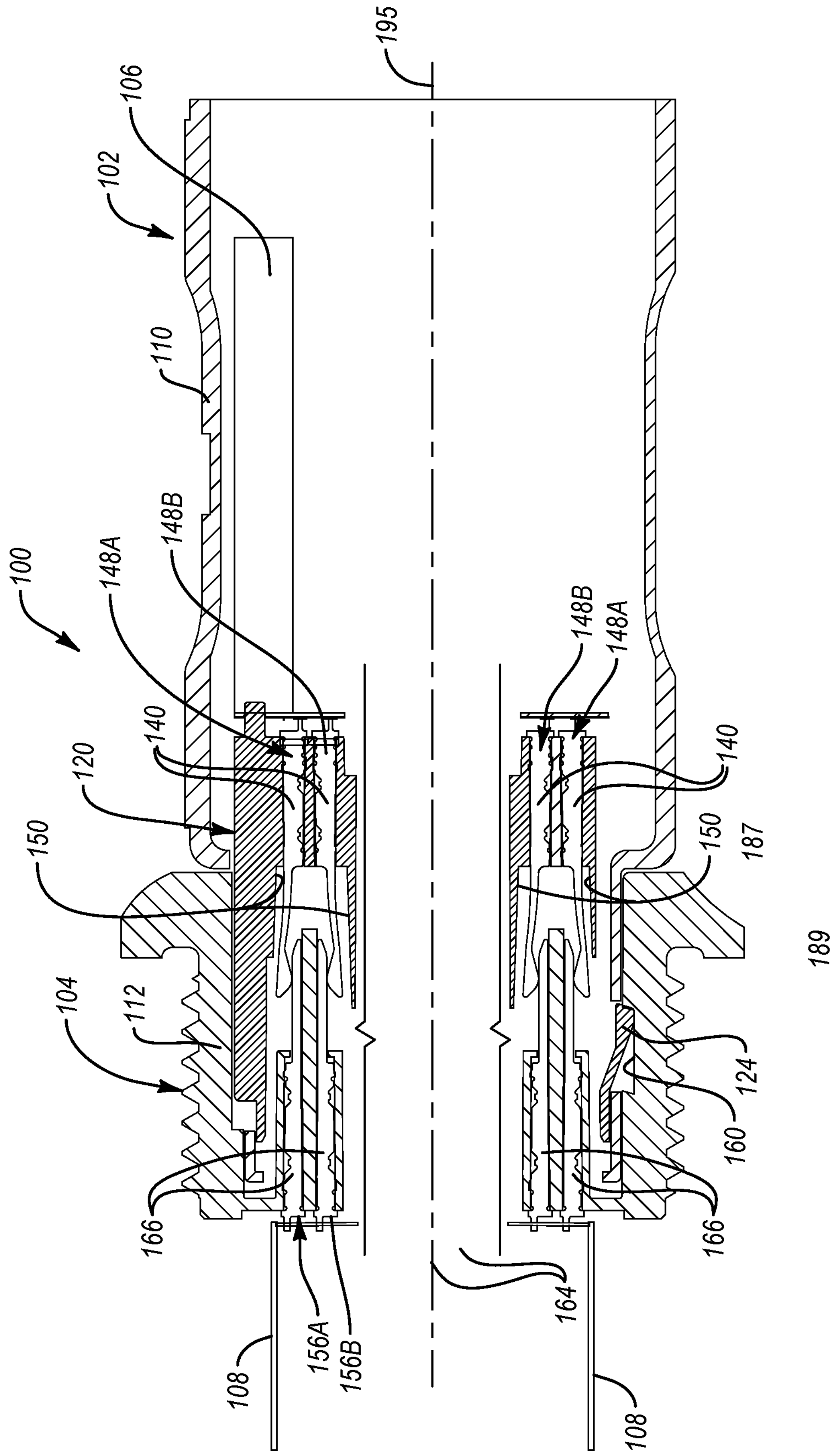
FIG. 1B illustrates a cross-sectional side elevation view of the electrical connector of FIG. 1A, shown with a plug of the electrical connector connected to a receptacle of the electrical connector, according to one or more examples of the present disclosure.
Figure 1C:
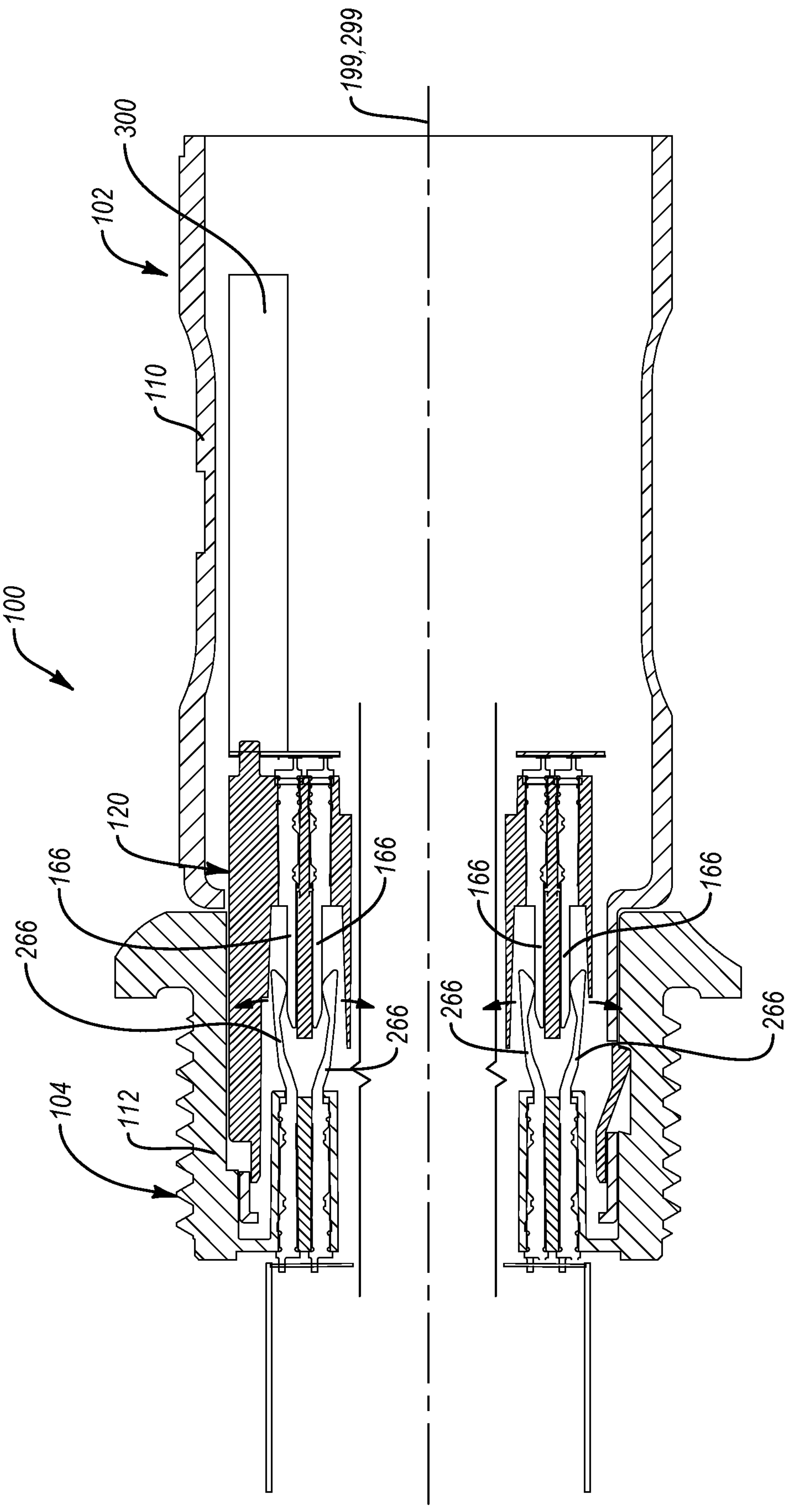
FIG. 1C illustrates a cross-sectional, side elevation view of the electrical connector of FIG. 1A, shown with a plug of the electrical connector connected to a receptacle of the electrical connector, according to one or more examples of the present disclosure.
Figure 15:
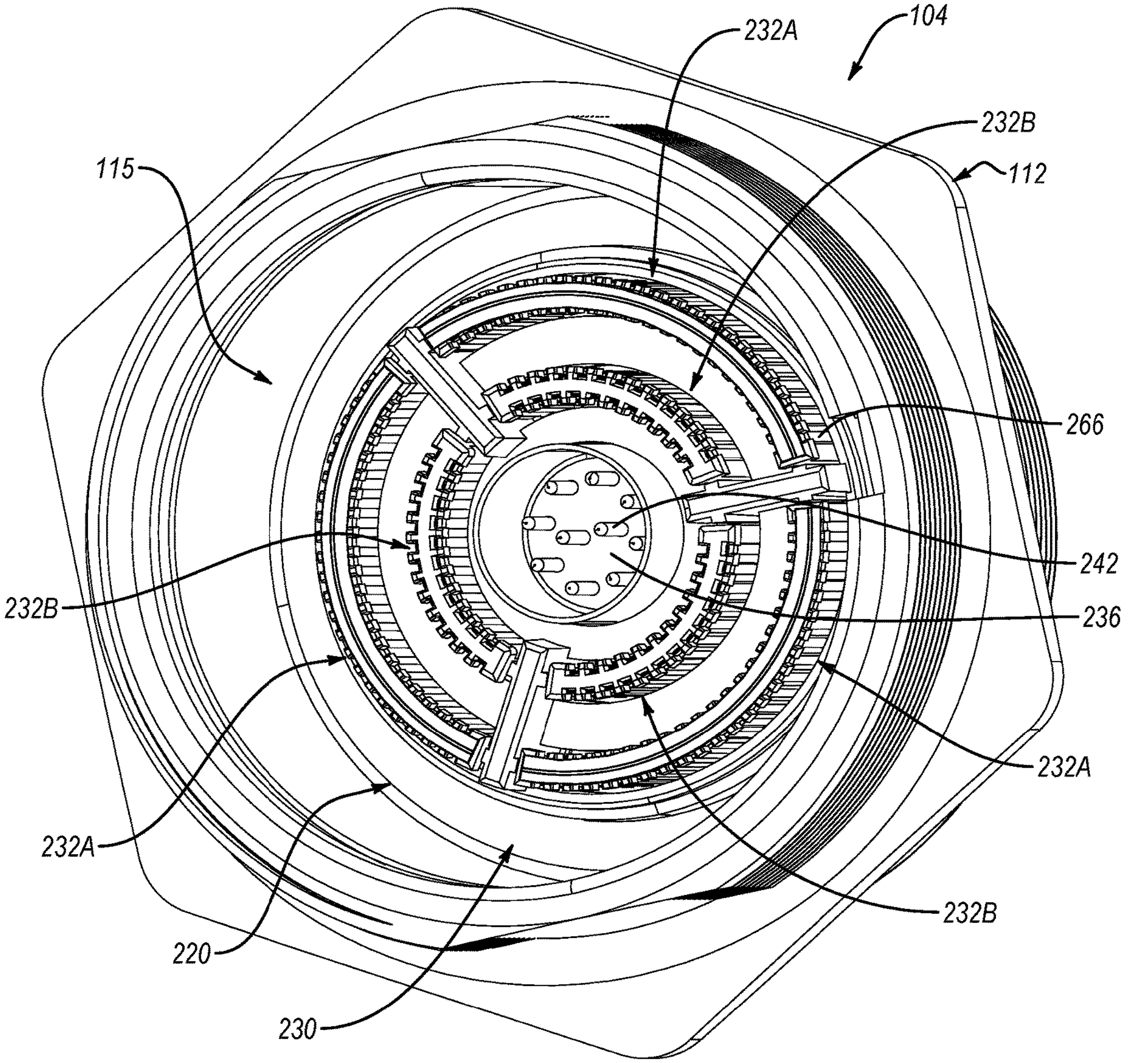
FIG. 15 illustrates a forward, perspective view of a receptacle of an electrical connector, according to one or more examples of the present disclosure.

Referring back to FIGS. 1A and 2, the receptacle 104 of the electrical connector 100 includes a housing 112 and flexible circuit boards 300 extending from the housing 112. Each flexible circuit board 300 of the receptacle 104 is electrically coupled to one or more of receptacle electrical contacts 266 of the receptacle 104 at one end and other electrical connections (not shown), such as those of a medical tool or medical equipment, at an opposite end. The housing 112 is configured to help receive the plug 102. In some examples, the housing 112 includes an engagement end portion 116 with alignment apertures and retention apertures spaced apart about the periphery of the engagement end portion 116, and configured to engage corresponding alignment apertures and retention apertures of the plug 102. The housing 112 also helps define an engagement socket 115 of the receptacle 104 (see, e.g., FIG. 15) that is sized and shaped to complement the engagement end portion 116 of the plug 102. For example, the engagement socket 115 of the receptacle 104 is configured to matingly receive the engagement end portion 116 of the plug 102 as shown in FIGS. 1A-1C.

The receptacle 104 further includes a receptacle contact carrier 220 housed within an interior cavity of the housing 112. The receptacle contact carrier 220 can be non-removably fixed to or selectively removably coupled to the housing 112. In some examples, the receptacle contact carrier 220 is non-movably fixed to the housing 112. Moreover, the receptacle contact carrier 220 at least partially defines the engagement socket 115 of the receptacle 104. In some implementations, the receptacle contact carrier 220 is substantially contiguous with the engagement socket 115 and, in effect, is a continuation of the engagement socket 115 such that the housing 112 and the contact carrier 180 collectively form the engagement socket 115.

Referring to FIGS. 15-18, the receptacle 104 further includes a receptacle contact carrier 220 housed within the interior cavity of the housing 112. The receptacle contact carrier 220 includes a receptacle frame 230, outer ring-segment assemblies 232A, inner ring-segment assemblies 232B, and a receptacle central insert 236. The outer ring-segment assemblies 232A, the inner ring-segment assemblies 232B, and the receptacle central insert 236 are coupled with and retained by the receptacle frame 230. Accordingly, the outer ring-segment assemblies 232A, the inner ring-segment assemblies 232B, and the receptacle central insert 236 are formed or assembled separately from that of the receptacle frame 230 and subsequently coupled with (e.g., attached to) receptacle frame 230.

Each one of the outer ring-segment assemblies 232A and the inner ring-segment assemblies 232B includes receptacle electrical contacts 266. Additionally, the receptacle central insert 236 includes couplings 242, which can be electrical contacts, fluidic couplings, pneumatic couplings, fiber-optic couplings, and the like. In some examples, one or more of the couplings 242 includes a multi-axial coupling, such as a coaxial coupling, a triaxial coupling, a quadraxial coupling, and the like. The couplings 242 of the receptacle central insert 236 are identical types of couplings in some examples. However, in other examples, one or more of the couplings 242 is a type of coupling that is different than another or others of the couplings 242. The receptacle central insert 236 has nine couplings 242 in the illustrated example. However, in other examples, the receptacle central insert 236 has fewer than nine couplings 242 (e.g., one to eight couplings 242) or more than nine couplings 242 (e.g., ten, eleven, twelve, eighteen, or more couplings 242).

Figure 19:
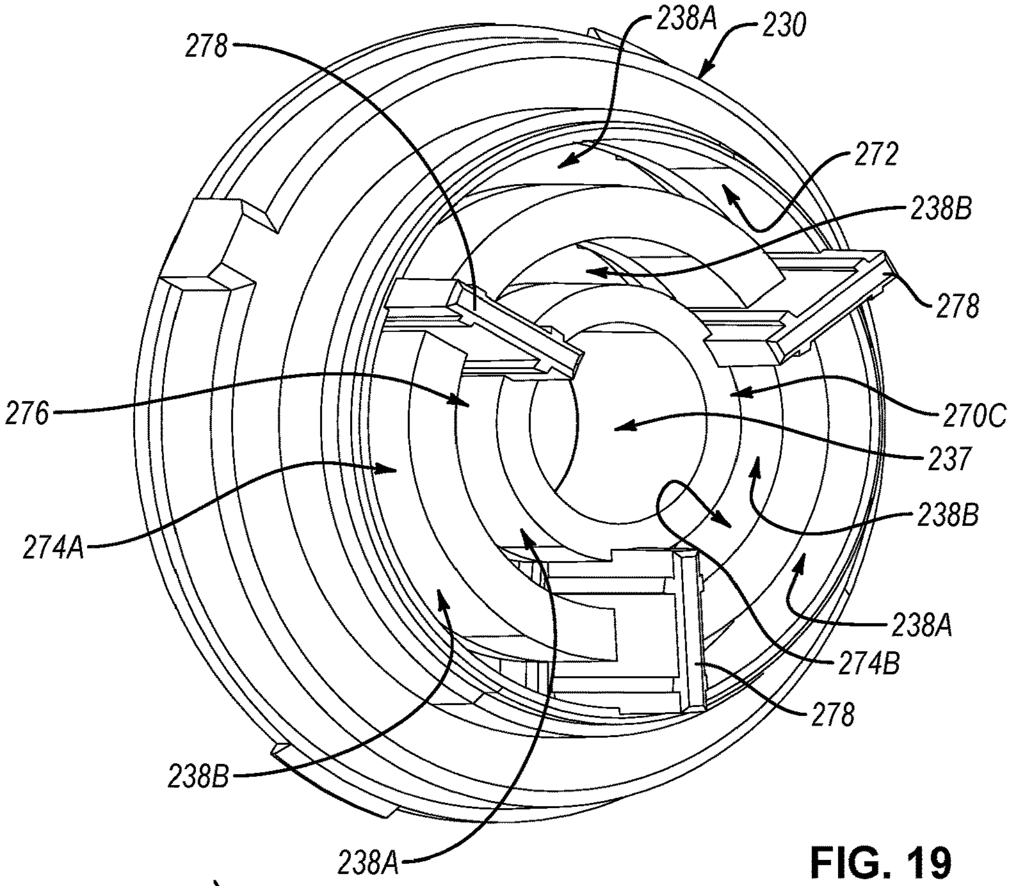
FIG. 19 illustrates a forward, perspective view of a receptacle frame of the receptacle contact carrier of FIG. 17, according to one or more examples of the present disclosure.
Figure 20:
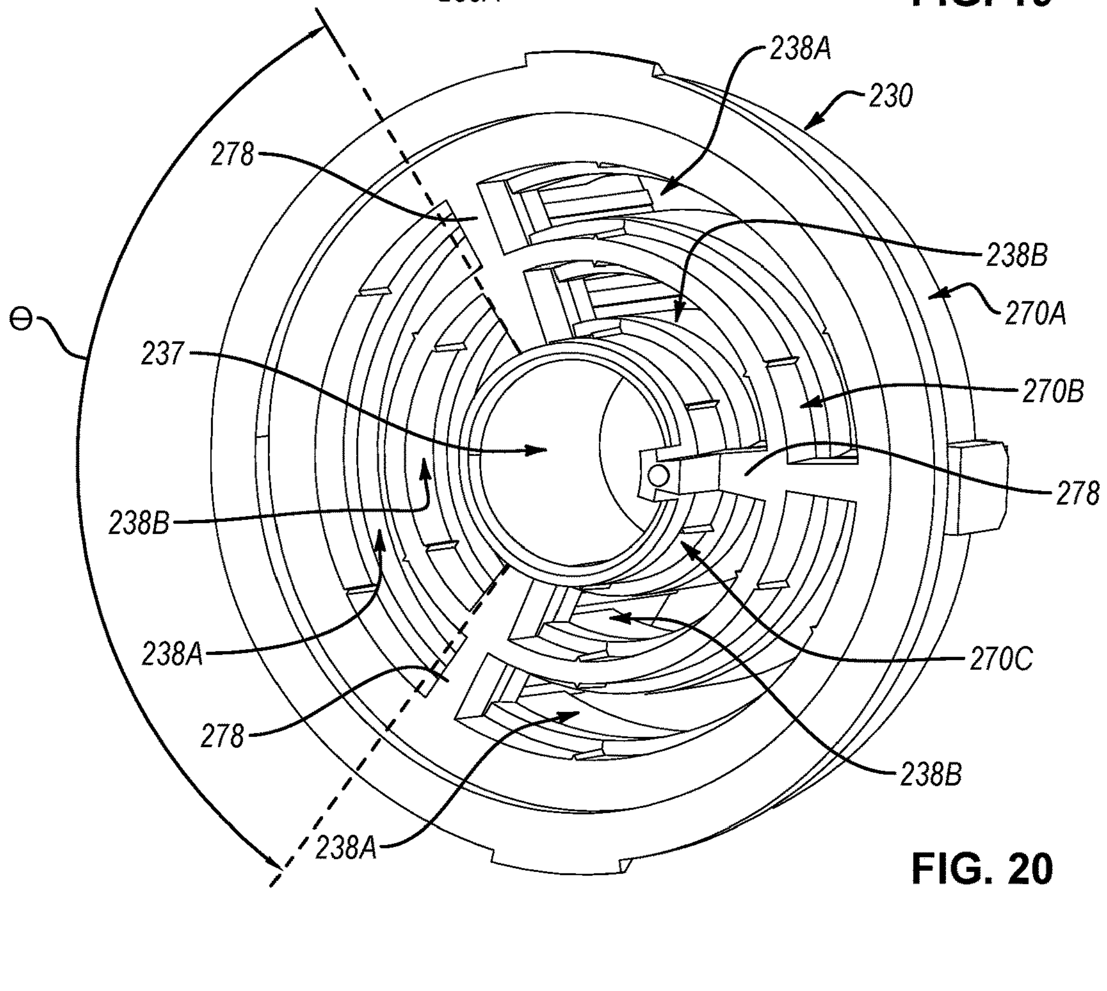
FIG. 20 illustrates a rearward, perspective view of the receptacle frame of FIG. 19, according to one or more examples of the present disclosure.

Referring now to FIGS. 19 and 20, the receptacle frame 230 includes multiple concentric and radially spaced-apart rings. In the illustrated example, the receptacle frame 230 includes three rings. More specifically, in the illustrated example, the receptacle frame 230 includes an outer ring 270A, a middle ring 270B, and an inner ring 270C. The outer ring 270A is radially outwardly spaced apart from the middle ring 270B, and the middle ring 270B is radially outwardly spaced apart from the inner ring 270C. In other words, the inner ring 270C is closer to a central axis 299 of the receptacle frame 230 than the middle ring 270B, and the middle ring 270B is closer to the central axis 299 of the receptacle frame 230 than the outer ring 270A. The receptacle frame 230 additionally includes spokes 278, perpendicular to the central axis 299 and extending radially away from the central axis 299. The spokes 278 are uniformly angularly spaced about the central axis 299. The spokes 278 couple together the outer ring 270A, the middle ring 270B, and the inner ring 270C.

The receptacle frame 230 also includes outer apertures 238A, inner apertures 238B, and a central aperture 237, which are concentric relative to each other and the central axis 299 of the receptacle frame 230. The apertures extend entirely through the receptacle frame 230 in a direction parallel to the central axis 299. Each one of the outer apertures 238A is defined between the outer ring 270A (e.g., a radially inward surface 272 of the outer ring 270A), the middle ring 270B (e.g., a radially outward surface 274A of the middle ring 270B), and an adjacent two of the spokes 278. Similarly, each one of the inner apertures 238B is defined between the middle ring 270B (e.g., a radially inward surface 274B of the middle ring 270B), the inner ring 270C (e.g., a radially outward surface 276 of the inner ring 270C), and an adjacent two of the spokes 278. In some examples, receptacle frame 230 has a one-piece unitary and continuous monolithic construction. In other words, in such examples, the outer ring 270A, the middle ring 270B, and the spokes 278 are co-formed (e.g., co-molded) together. In some examples, the receptacle frame 230 is made of an electrically non-conductive material. However, the receptacle frame 230 can be made of an electrically conductive material in certain examples.

Although, in the illustrated examples, the receptacle frame 230 includes three rings and two sets of apertures each between corresponding ones of the three rings, according to other examples, the receptacle frame 230 can have more than three rings (e.g., four, five, six, or more rings) that define three or more sets of apertures each between corresponding ones of the more than three rings. Additionally, although in the illustrated examples, the receptacle contact carrier 220, including the receptacle frame 230, is formed separate from the housing 112 and coupled to the housing 112, in other examples, the receptacle frame 230 and the housing 112 are co-formed, and form a one-piece monolithic and seamless construction. In other words, in some examples, the receptacle frame 230 can function as a housing of the receptacle 104, or alternatively, a housing of the receptacle 104 can function as the receptacle frame 230.

The outer ring 270A, the middle ring 270B, and the inner ring 270C have a circular shape. Accordingly, each one of the outer apertures 238A and the inner apertures 238B has an arc shape or a semi-circular shape. Each one of the outer apertures 238A and the inner apertures 238B has an arc measure θ that is less than 360°. The arc measure θ of each one of the outer apertures 238A and the inner apertures 238B is dependent on the number and the width of the spokes 278. Moreover, the quantity of the outer apertures 238A and the inner apertures 238B is also dependent on the number and the width of the spokes 278. In the illustrated example, the receptacle frame 230 includes three spokes 278 such that the receptacle frame 230 also includes three outer apertures 238A and three inner apertures 238B (e.g., a total of six apertures). However, in other examples, the receptacle frame 230 includes two spokes 278 or more than three spokes 278 such that the receptacle frame 230 includes two, or more than three, outer apertures 238A and two, or more than three, inner apertures 238B. The widths of the spokes 278 can be the same so that the arc measure θ of each one of the outer apertures 238A is the same, and the arc measure θ of each one of the inner apertures 238B is the same. Moreover, in some examples, the width of the spokes 278 is such that the arc measure θ of each one of the outer apertures 238A and the inner apertures 238B is the same. In certain examples, the arc measure θ of each one of the outer apertures 238A and/or the inner apertures 238B is between, and inclusive of, 10° and 170°. In one example, the arc measure θ of each one of the outer apertures 238A and/or the inner apertures 238B is between, and inclusive of, 30° and 150°. In yet another example, the arc measure θ of each one of the outer apertures 238A and/or the inner apertures 238B is between, and inclusive of, 50° and 130° (e.g., between, and inclusive of, 55° and 65°).

Each one of the outer ring-segment assemblies 232A is located within and is fixed to a corresponding one of the outer apertures 238A of the receptacle frame 230. Similarly, each one of the inner ring-segment assemblies 232B is located within and is fixed to a corresponding one of the inner apertures 238B of the receptacle frame 230. Accordingly, the quantity of the outer ring-segment assemblies 232A and the inner ring-segment assemblies 232B of the receptacle contact carrier 220 corresponds with the quantity of the outer apertures 238A and the inner apertures 238B, respectively. For example, in the illustrated implementations, the receptacle frame 230 includes three outer apertures 238A and three inner apertures 238B, such that there are three outer ring-segment assemblies 232A and three inner ring-segment assemblies 232B. However, in other examples, where the receptacle frame 230 includes one, two, or more than three, outer apertures 238A, and one, two, or more than three, inner apertures 238B, the receptacle contact carrier 220 includes one, two, or more than three, outer ring-segment assemblies 232A, and one, two, or more than three, inner ring-segment assemblies 232B.

When fitted within the outer apertures 238A, each one of the outer ring-segment assemblies 232A is circumferentially spaced apart from adjacent ones of the outer ring-segment assemblies 232A by a corresponding one of the spokes 178. Similarly, when fitted within the inner apertures 238B, each one of the inner ring-segment assemblies 232B is circumferentially spaced apart from adjacent ones of the inner ring-segment assemblies 232B by a corresponding one of the spokes 178. Accordingly, in some examples, when coupled to the receptacle frame 230, a gap is defined between adjacent ones of the outer ring-segment assemblies 232A and a gap is defined between adjacent ones of the inner ring-segment assemblies 232B. Each one of the spokes 178 can partially or entirely fill the gap between corresponding adjacent ones of the outer ring-segment assemblies 232A and corresponding adjacent ones of the inner ring-segment assemblies 232B.

However, in some examples, when fitted within the outer apertures 238A, each one of the outer ring-segment assemblies 232A contacts (e.g., abuts or adjoins) the adjacent ones of the outer ring-segment assemblies 232A. Similarly, when fitted within the inner apertures 238B, each one of the outer ring-segment assemblies 232A contacts (e.g., abuts or adjoins) the adjacent ones of the inner ring-segment assemblies 232B. Accordingly, in these examples, when coupled to the receptacle frame 230, there are at least portions where no gap is defined between adjacent ones of the outer ring-segment assemblies 232A and no gap is defined between adjacent ones of the inner ring-segment assemblies 232B. According to certain examples, the spokes 178 can be configured such that each one of the spokes 178 is only partially between corresponding adjacent ones of the outer ring-segment assemblies 232A and corresponding adjacent ones of the inner ring-segment assemblies 232B, and enables direct contact between at least portions of adjacent ones of the outer ring-segment assemblies 232A and adjacent ones of the inner ring-segment assemblies 232B.

The portions of the outer ring-segment assemblies 232A in contact with each other, and the portions of the inner ring-segment assemblies 232B in contact with each other, can merely frictionally engaged with each other, fastened to each other, or affixed to each other, such as via an adhesive, a glue, an epoxy, a braze, or a weld. In some examples, the outer ring-segment assemblies 232A and the inner ring-segment assemblies 232B are respectively assembled together (e.g., brought into contact with each other) before being inserted into the outer apertures 238A and the inner apertures 238B, respectively. For example, the outer ring-segment assemblies 232A can be affixed to each other, to form a unitary ring-shaped assembly, and the inner ring-segment assemblies 232B can be affixed to each other, to form a unitary ring-shaped assembly, before being inserted into the outer apertures 238A and the inner apertures 238B, respectively. In alternative examples, the outer ring-segment assemblies 232A come into contact with each other, and the inner ring-segment assemblies 232B come into contact with each other, as they are inserted into the outer apertures 238A and the inner apertures 238B, respectively.

Figure 21:
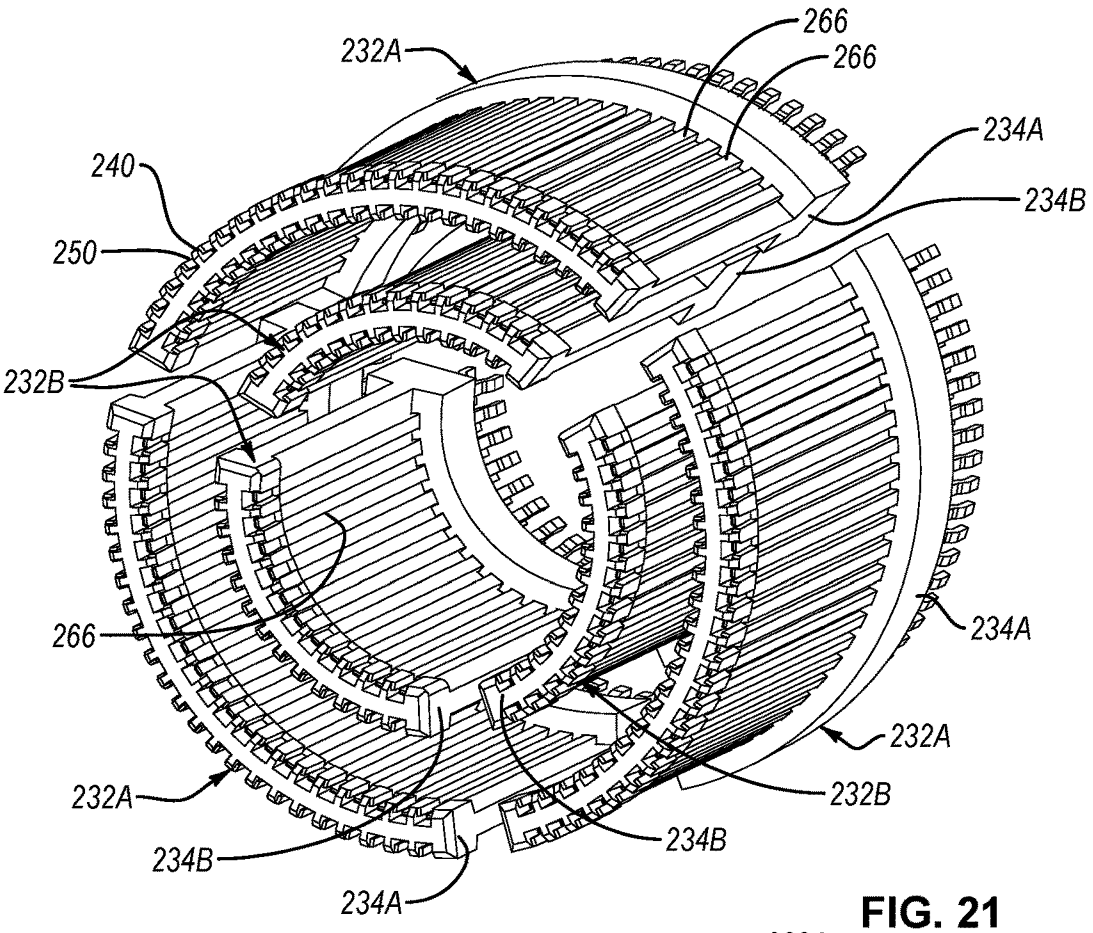
FIG. 21 illustrates a forward, perspective view of outer and inner ring-segment assemblies of the receptacle contact carrier of FIG. 17, according to one or more examples of the present disclosure.
Figure 22:
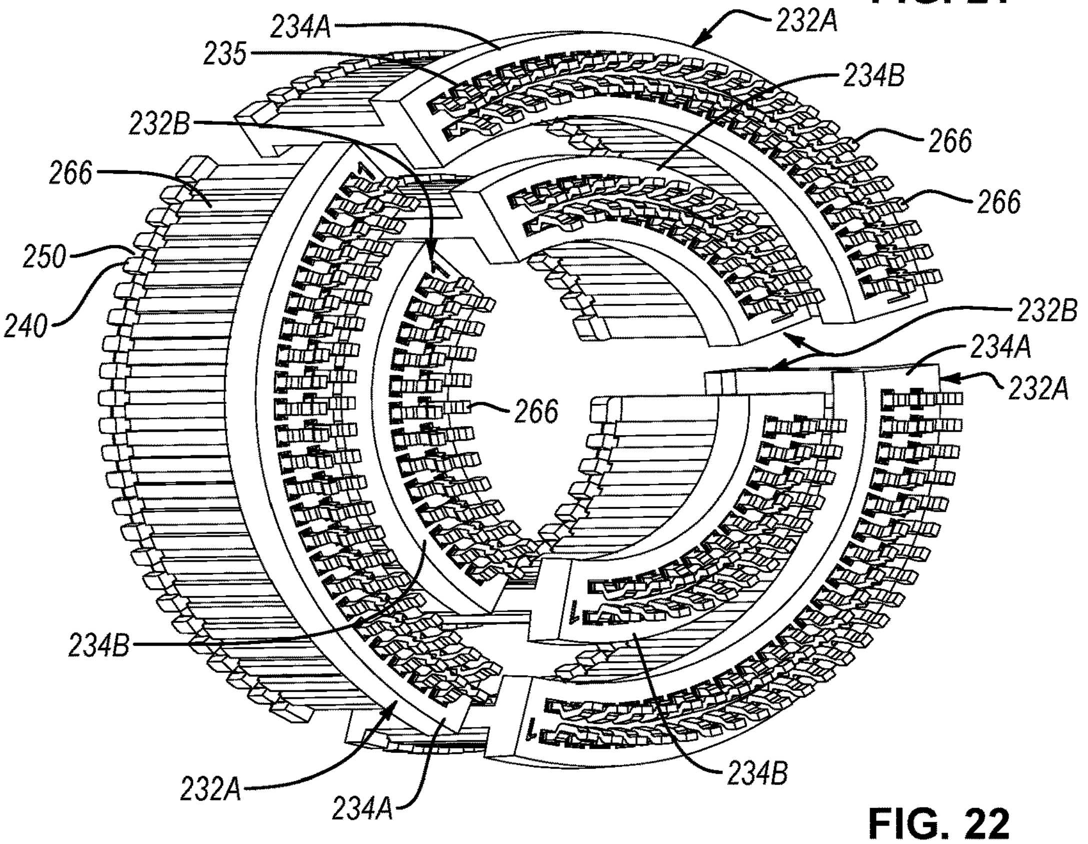
FIG. 22 illustrates a rearward, perspective view of the outer and inner ring-segment assemblies of FIG. 21, according to one or more examples of the present disclosure.

Referring now to FIGS. 21-23, each one of the outer ring-segment assemblies 232A includes an outer ring segment 234A, and each one of the inner ring-segment assemblies 232B includes an inner ring segment 234B. The outer ring segments 234A and the inner ring segments 234B are made of an electrically non-conductive material (e.g., dielectric material).

Referring to FIG. 22, each one of the outer ring segments 234A and the inner ring segments 234B has an arc shape or a semi-circular shape, and a plurality of contact apertures 235. Each one of the contact apertures 235 is configured to receive and at least partially retain one of the receptacle electrical contacts 266. When received and retained in a contact aperture 235, a proximal portion of the receptacle electrical contact 266 protrudes from the contact aperture 235 and is retained within a corresponding one of slots 250 formed in the ring segments. Furthermore, when received and retained in a contact aperture 235, a distal portion of the receptacle electrical contact 266 protrudes from a rearward side of the corresponding ring segment. For any one of the ring segments, the contact apertures 235 are arranged in at least two concentric arc-shaped rows that are radially spaced apart from each other. The distance between the arc-shaped rows of contact apertures 235 corresponds to a desired distance, which is associated with a thickness of the corresponding one of the outer ring segments 234A or the inner ring segments 234B between the contact apertures 235. In this manner, the thickness of the outer ring segments 234A or the inner ring segments 234B between the contact apertures 235 acts as a dielectric for electrically isolating the contact apertures 235 from one another. The arc-shaped rows of the contact apertures 235 are concentric with the central axis 299, such that the receptacle electrical contacts 266 are also arranged in arc-shaped rows that are concentric with the central axis 299.

In the illustrated examples, the rings of the receptacle frame 230 are circular, the apertures defined between the rings are arc-shaped or semi-circular-shaped, and the ring segments are arc-shaped or semi-circular-shaped. However, in other examples, the rings of the receptacle frame 230 can be non-circular, the apertures defined between the rings can be non-arc-shaped or non-semi-circular-shaped, and the ring segments can be non-arc-shaped or non-semi-circular-shaped. For example, in some implementations, the rings of the receptacle frame 230 are polygonal-shaped (e.g., hexagonal-shaped), the apertures defined between the rings are linear, and the ring segments are linear.

In some examples, each one of the outer ring segments 234A and the inner ring segments 234B forms a friction fit or an interference fit with the corresponding one of the outer apertures 238A and the inner apertures 238B. In these or alternative examples, a bonding agent, such as an adhesive, glue, epoxy, and the like, is applied between the ring segments and the surfaces of the receptacle frame 230 defining the corresponding apertures to help secure the ring segments to the receptacle frame 230. Because the outer ring-segment assemblies 232A and the inner ring-segment assemblies 232B can be individually assembled prior to attachment to the receptacle frame 230, the receptacle 104 can be assembled in a more efficient, timely, and reliable manner. Isolating the assembly of one ring-segment assembly relative to another ring-segment assembly promotes more space and control for handling, inserting, and retaining the receptacle electrical contacts 266 into the ring-segment assemblies. Moreover, inserting and coupling the ring-segment assemblies into the receptacle frame 230 independently of any other one of the ring-segment assemblies promotes ease and reliability when assembling the receptacle contact carrier 220. Furthermore, separating the forming of the receptacle frame 230 from the ring-segment assemblies reduces the complexity of the parts and thus the overarching molding process.

Referring to FIGS. 21-23, in some examples, each one of the outer ring segments 234A and the inner ring segments 234B includes ribs and slots, arranged in arc-shaped groupings, which prevent compliance (e.g., flexing) of the receptacle electrical contacts 266 as the plug 102 and the receptacle 104 are connected together. More specifically, each one of the outer ring segments 234A and the inner ring segments 234B includes ribs 244 and slots 250. The ribs 244 and the slots 250 are positioned on the outer ring segments 234A and the inner ring segments 234B, to receive the proximal ends of the receptacle electrical contacts 266. When received, the configuration of the slots 250 prevents the receptacle electrical contacts 266 from moving radially and laterally within the slots 250. Accordingly, the receptacle electrical contacts 266 are not allowed to flex radially while remaining within the slots 250 and constrained in a fixed angular position, which promotes electrical isolation between the receptacle electrical contacts 266 and proper positioning for contacting the plug electrical contacts 166 of the plug 102.

In some examples, the receptacle contact carrier 220 includes at least one hundred and twenty-eight receptacle electrical contacts 266, plus or minus 25%. In other examples, the receptacle contact carrier 220 includes at least one hundred and twenty-eight receptacle electrical contacts 266, plus or minus 25%. According to certain examples, the receptacle contact carrier 220 includes at least two hundred and fifty-six receptacle electrical contacts 266, plus or minus 25%. In some examples, each receptacle electrical contact 266 is configured to provide a conductive surface for receiving a corresponding one of the plug electrical contacts 166, as described in U.S. Pat. No. 10,931,069. The receptacle electrical contacts 266 are made from an electrically conducting material, such as copper. Moreover, in one implementation, the receptacle electrical contacts 266 are made using a metal stamping process.

Figure 16:
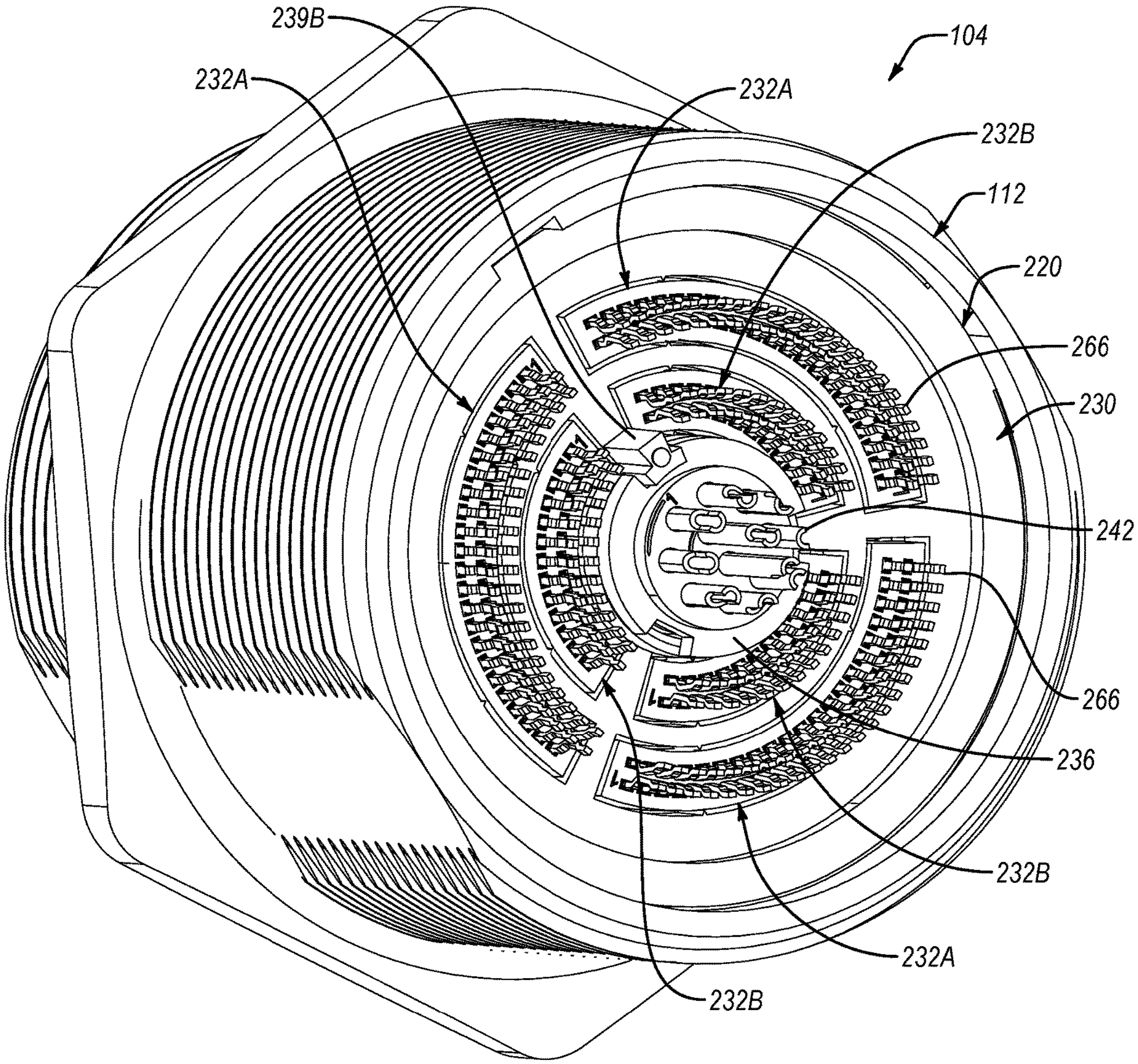
FIG. 16 illustrates a rearward, perspective view of the receptacle of FIG. 15, according to one or more examples of the present disclosure.
Figure 18:
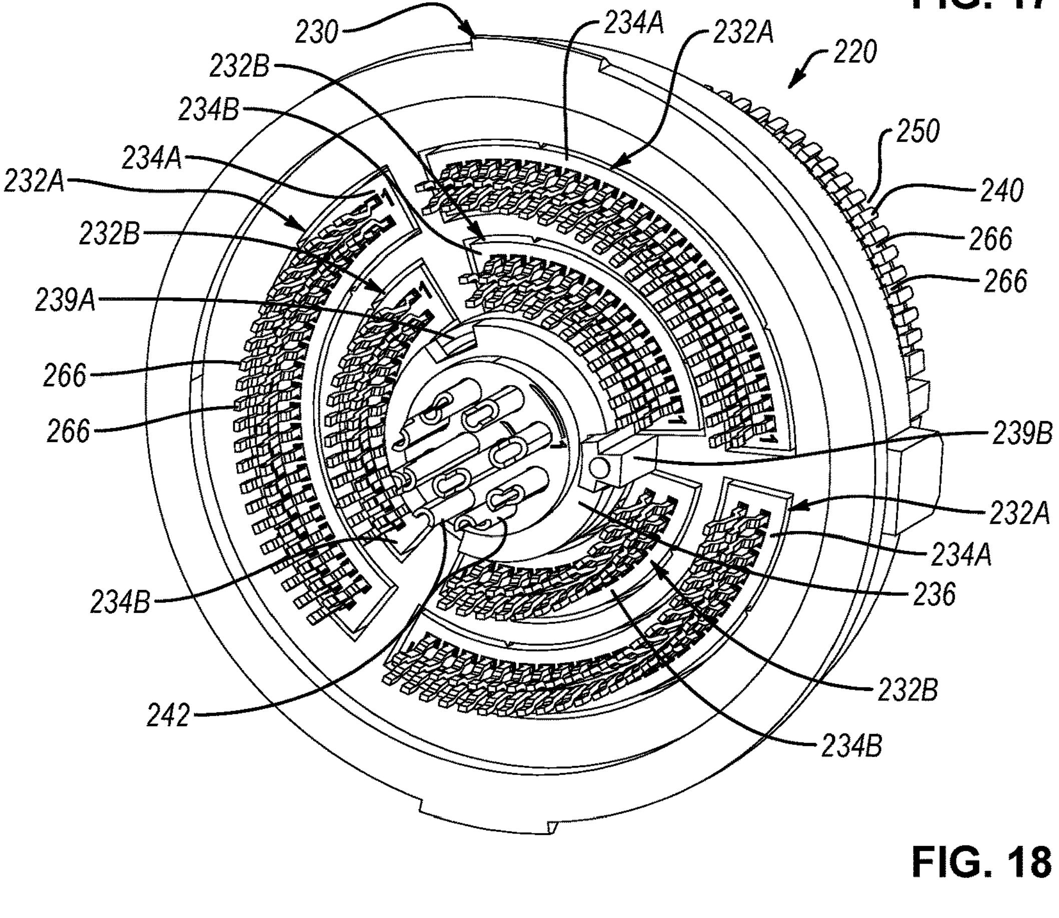
FIG. 18 illustrates a rearward, perspective view of the receptacle contact carrier of FIG. 17, according to one or more examples of the present disclosure.

Referring to FIGS. 16 and 18, the receptacle central insert 236 of the receptacle contact carrier 220 is coupled to and positioned within the central aperture 237 of the receptacle frame 230. The receptacle central insert 236 includes a housing that retains the couplings 242.

In some examples, the receptacle central insert 236 forms a friction fit or an interference fit with the central aperture 237. In these or alternative examples, a bonding agent, such as an adhesive, glue, epoxy, and the like, is applied between the receptacle central insert 236 and the surfaces of the receptacle frame 230 defining the central aperture 237 to help secure the receptacle central insert 236 to the receptacle frame 230. In certain examples, the receptacle central insert 236 includes one or more keying features, such as slots 239A formed in a flange of the receptacle central insert 236. The keying features of the receptacle central insert 236 are configured to engage a corresponding one or more keying features, such as a tab 239B, of the receptacle frame 230. Engagement between the keying features of the receptacle central insert 236 and the receptacle frame 230 ensures the couplings 242 of the receptacle central insert 236 are properly positioned and orientated within the central aperture 237 relative to the position and orientation of the receptacle electrical contacts 266. In some examples, the receptacle central insert 236 can be interchangeable or reconfigurable with other receptacle central inserts to meet any of various interconnect capabilities, such as those demanded by a customer. For example, the receptacle central insert 236 can be non-removably fixed to or selectively removably coupled to the receptacle contact carrier 220. Interchangeability can be facilitated through the use of selectively releasable interlocking elements, such as clips, tabs, detents, etc., interference fit coupling, and/or any of various other like elements.

Referring to FIG. 1B, the plug 102 is shown inserted into the receptacle 104 to establish electrical connectivity between the plug 102 and the receptacle 104. The process of inserting the plug 102 into the receptacle 104 and establishing electrical connectivity between the plug 102 and the receptacle 104 is initiated by bringing the plug 102 into at least approximate coaxial alignment with the receptacle 104. When aligned, the plug 102 and the receptacle 104 can be moved toward each other until the plug electrical contacts 166 contact the receptacle electrical contacts 266. Such contact causes the plug electrical contacts 166 to radially flex, which ensures proper contact between the plug electrical contacts 166 and the receptacle electrical contacts 266. As the plug 102 is further inserted into the receptacle 104, the plug electrical contacts 166 slide along corresponding receptacle electrical contacts 266, which helps to decontaminate the electrical contacts and ensures a reliable stable connection between the electrical contacts. Such a slidable arrangement also promotes a lower insertion force for connection between the contacts to be established. Further insertion of the plug 102 into the receptacle 104 results in coupling between the couplings 142 and the couplings 242.

In some examples, as shown in FIG. 1C, the plug contact carrier 120 and the receptacle contact carrier 220 of the electrical connector 100 are configured to enable a switch of the operation of the plug electrical contacts 166 and the receptacle electrical contacts 266. More specifically, the electrical connector 100 can be configured so that the receptacle electrical contacts 266 of the receptacle 104 are flexible and radially movable toward and away from the central axis 299, and the plug electrical contacts 166 of the plug 102 are fixed relative to the central axis 199, such that the plug electrical contacts 166 are not radially movable toward and away from the central axis 199.

Referring to FIG. 1C, the plug 102 of the electrical connector 100 is shown inserted into the receptacle 104 of the electrical connector 100 to establish electrical connectivity between the plug 102 and the receptacle 104. The process of inserting the plug 102 into the receptacle 104, of the electrical connector 100 shown in FIG. 1C, and establishing electrical connectivity between the plug 102 and the receptacle 104 is similar to that of the electrical connector 100 shown in FIG. 1C. However, since the configuration of the plug electrical contacts 166 and the receptacle electrical contacts 266 are effectively reversed in the example of FIG. 1C, the insertion process also has some differences. For example, as the plug 102 of the electrical connector 100 is fully inserted into the receptacle 104 of the electrical connector 100 of FIG. 1C, the plug electrical contacts 166 contact the receptacle electrical contacts 266. Such contact causes the receptacle electrical contacts 266 of the receptacle 104 to radially flex (outward or inward as shown by directional arrows), relative to the plug electrical contacts 166, which remain stationary. Such flexing of the receptacle electrical contacts 266 of the receptacle 104, relative to the plug electrical contacts 166 of the plug 102, ensures proper contact between the receptacle electrical contacts 266 and the plug electrical contacts 166.

According to yet other examples, both the plug electrical contacts 166 and the receptacle electrical contacts 266 are flexible or compliant, so that upon insertion of the plug 102 into the receptacle 104, both the plug electrical contacts 166 and the receptacle electrical contacts 266 flex as they make contact with each other. Alternatively, in certain examples, both the plug electrical contacts 166 and the receptacle electrical contacts 266 are stationary, so that upon insertion of the plug 102 into the receptacle 104, both the plug electrical contacts 166 and the receptacle electrical contacts 266 do not move or flex as they make contact with each other. In some examples, some of the plug electrical contacts 166 are flexible and some are stationary, and corresponding ones of the receptacle electrical contacts 266 are flexible and stationary, so that each one of the plug electrical contacts 166 and the receptacle electrical contacts 266 contain a mixture of flexible and stationary contacts.

Figure 17:
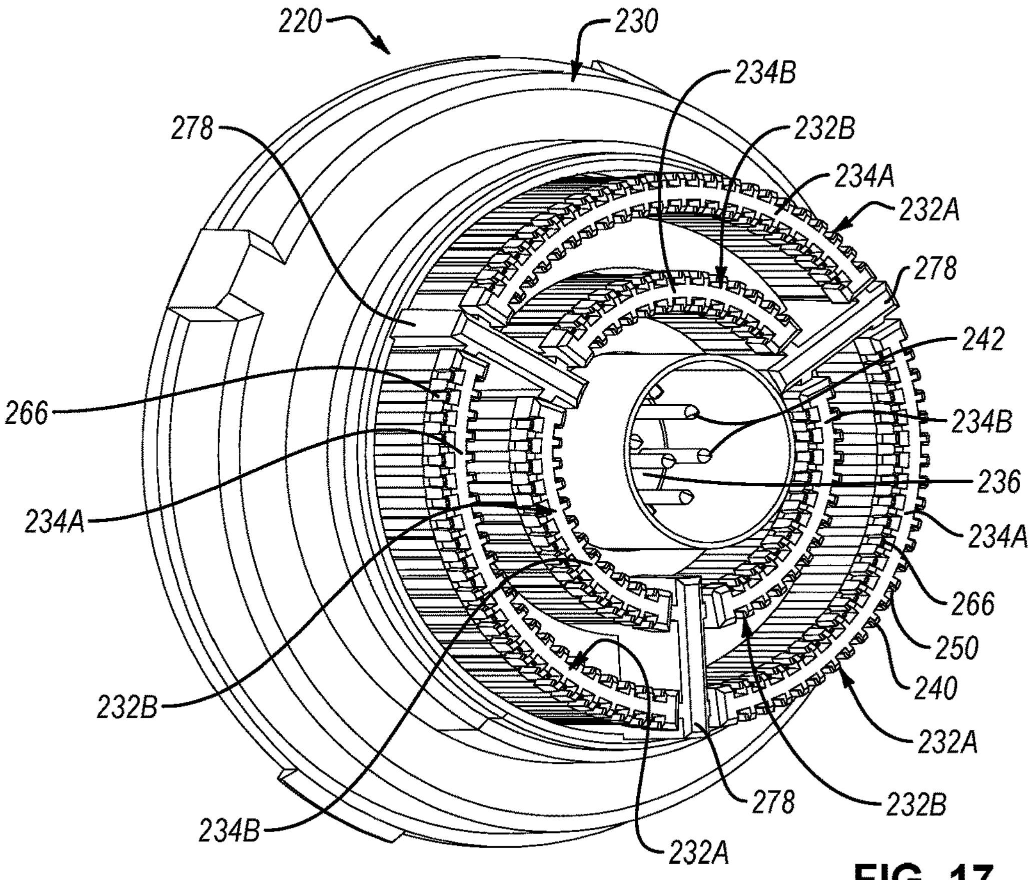
FIG. 17 illustrates a forward, perspective view of a receptacle contact carrier of the receptacle of FIG. 15, according to one or more examples of the present disclosure.

In the illustrated examples of the plug 102 and the receptacle 104, all surfaces of the plug frame 130 defining the apertures (other than the central apertures) include ribs 144 and slots 150, and both radially inner and radially outer surfaces of the ring segments of the receptacle 104 include ribs 244 and slots 150, with corresponding electrical contacts in the slots. Accordingly, in the illustrated examples, as shown in FIGS. 5 and 6, the configuration of the electrical contacts of the plug 102 are double sided so that each set of electrical contacts faces and is spaced apart from another set of electrical contacts (e.g., electrical contacts on surfaces that face each other). Similarly, in the illustrated examples, as shown in FIG. 17, the configuration of the electrical contacts of the receptacle 104 are double sided so that sets of electrical contacts are on opposite sides of each ring segment (e.g., electrical contacts on surfaces that face away from each other). Such a configuration optimizes (e.g., maximizes) the number of electrical contacts of the electrical connector 100. However, in other examples, all or part of the plug and the receptacle 104 can have a single sided configuration of electrical contacts. Accordingly, in these other examples, only one, or just part, of the surfaces of the plug 102 that face each other has ribs, slots, and electrical contacts, and only one, or part of one, side of the opposite sides of each ring segment of the receptacle 104 has ribs, slots, and electrical contacts.

Figure 24:
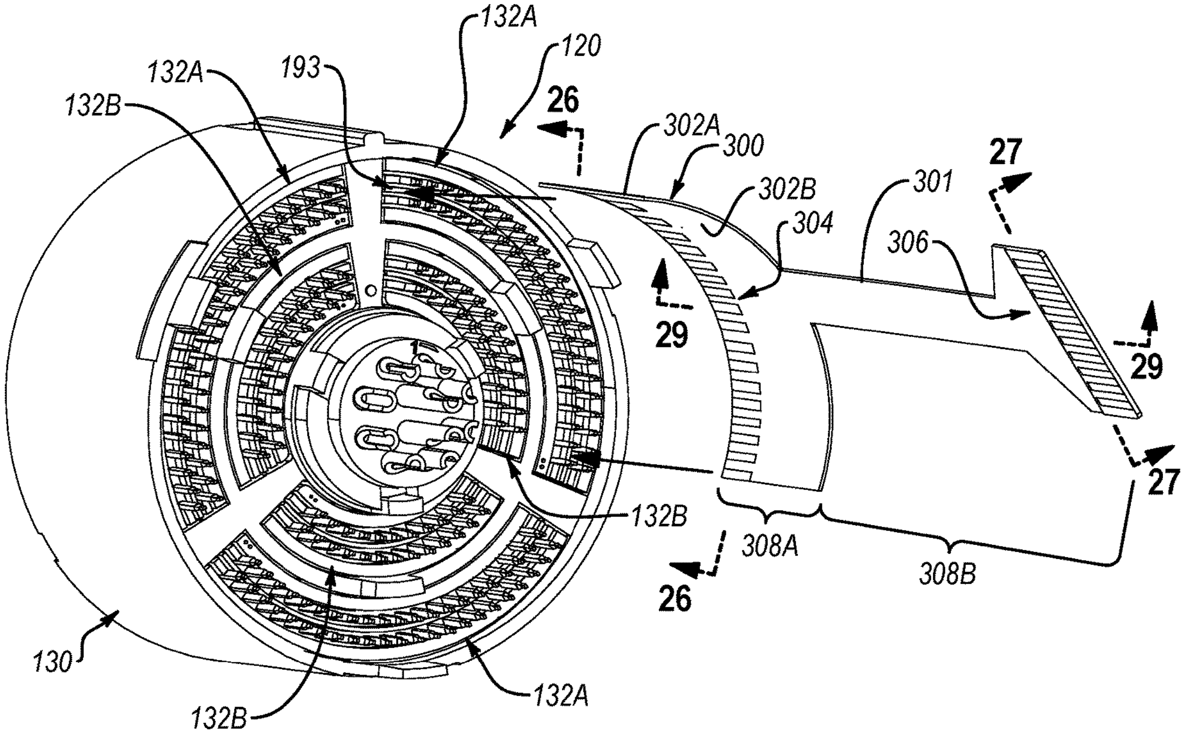
FIG. 24 illustrates a perspective view of a flexible circuit board and a receptacle contact carrier being assembled, according to one or more examples of the present disclosure.
Figure 25:
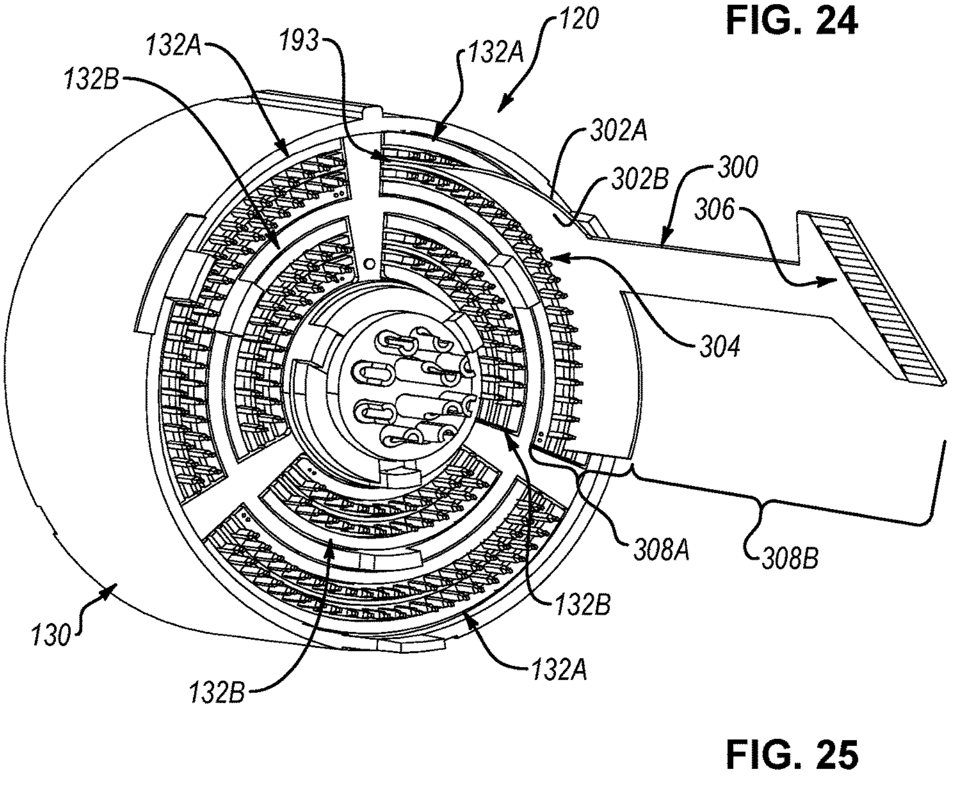
FIG. 25 illustrates a perspective view of the flexible circuit board and the receptacle contact carrier of FIG. 24, following assembly, according to one or more examples of the present disclosure.

Referring now to FIGS. 24 and 25, according to some examples, the flexible circuit board 300 has an arced end portion 308A (e.g., a curved portion) and a flat end portion 308B. The arced end portion 308A defines a proximal end of the flexible circuit board 300 and the flat end portion 308B defines a distal end of the flexible circuit board 300. The arced end portion 308A is electrically coupled to one of the plug 102 or the receptacle 104 and the flat end portion 308B is electrically coupled to a tool or a tool control system. In the illustrated example of FIGS. 24 and 25, the flexible circuit board 300 is shown coupled to the plug contact carrier 120 of the plug 102. However, the flexible circuit board 300 can be representative of any of the flexible circuit boards 300 shown in FIG. 1. Accordingly, the flexible circuit board 300 can be coupled to the receptacle contact carrier 220 of the receptacle 104. Unless otherwise indicated, the features of the flexible circuit board 300 will be described in association with features of the plug contact carrier 120, while recognizing the description is just as applicable to the analogous features of the receptacle contact carrier 220.

Figure 26A:
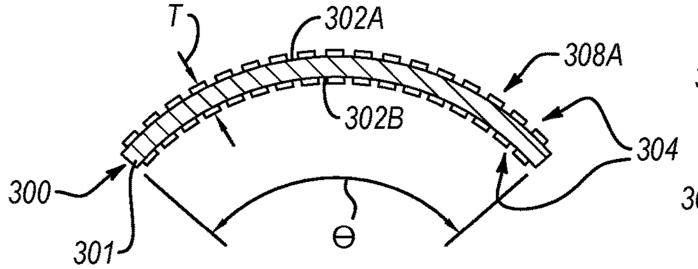
FIG. 26A illustrates a cross-sectional, front elevation view of a proximal end portion of a flexible circuit board, taken along the line 26-26 of FIG. 24, according to one or more examples of the present disclosure.
Figure 26B:
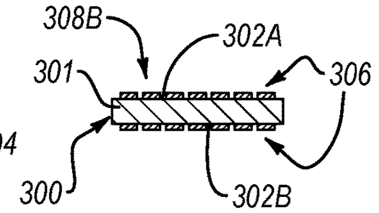
FIG. 26B illustrates a cross-sectional, front elevation view of a distal end portion of a flexible circuit board, taken along the line 27-27 of FIG. 24, according to one or more examples of the present disclosure.

The arc defined by the arced end portion 308A is concentric with the central axis of the plug 102. Accordingly, the arc defined by the arced end portion 308A is also concentric with the arcs defined by the groupings of the plug electrical contacts 166. Referring to FIG. 26A, the arced end portion 308A have an arc measure θ that is at least as big as an arc measure of each grouping of the plug electrical contacts 166. In some examples, the arc measure θ of the arced end portion 308A is at least as big as the arc measure θ of the ring segment to which the arced end portion 308A is attached.

The flexible circuit board 300 includes at least one flexible substrate 301 and electrical pads on the at least one flexible substrate 301. The flexible substrate 301 includes a first major surface 302A and a second major surface 302B, which is opposite the first major surface 302A and separate from the first major surface 302A by a thickness of the flexible substrate 301. As shown in FIGS. 24 and 25, according to one example, the flexible circuit board 300 includes proximal electrical pads 304 at the proximal end of the flexible circuit board 300 (e.g., on both the first major surface 302A and the second major surface 302B) and distal electrical pads 306 at the distal end of the flexible circuit board 300 (e.g., on both the first major surface 302A and the second major surface 302B). The electrical pads are configured to facilitate an electrical connection with the flexible circuit board 300 and are made of an electrically conductive material, such as copper. Although not shown in FIGS. 24 and 25, each one of the proximal electrical pads 304 is electrically coupled with a corresponding one or more of the distal electrical pads 306 via one or more electrical traces formed on or in the flexible substrate 301. As shown in FIG. 26A, the flexible circuit board 300 has a total thickness T, at a given location on the flexible circuit board 300, defined as the maximum thickness of the flexible circuit board 300, including the thicknesses of the flexible substrate 301 and any electrical pads at the given location.

As shown in FIGS. 24 and 25, the total thickness T of the flexible circuit board 300 is selected so that the arced end portion 308A is insertable into the gap defined between the arc-shaped rows of the plug electrical contacts 166. Moreover, the proximal electrical pads 304 are arranged on the proximal end of the flexible circuit board 300 so that each one of the proximal electrical pads 304 electrically contacts a corresponding one of the plug electrical contacts 166 when the arced end portion 308A is inserted into the gap. In this manner, electrical connectivity is established between each one of the proximal electrical pads 304 the corresponding one of the plug electrical contacts 166. Electrical connectivity can be promoted by bonding, soldering, or brazing together the proximal electrical pads 304 and the plug electrical contacts 166 via a conductive material, such as solder. Although not shown, it is recognized that the arced end portion 308A of one of multiple flexible circuit boards 300 is inserted between and electrically connected to the arc-shaped rows of the plug electrical contacts 166 of each one of the outer ring-segment assemblies 132A and the inner ring-segment assemblies 132B.

Figure 27:
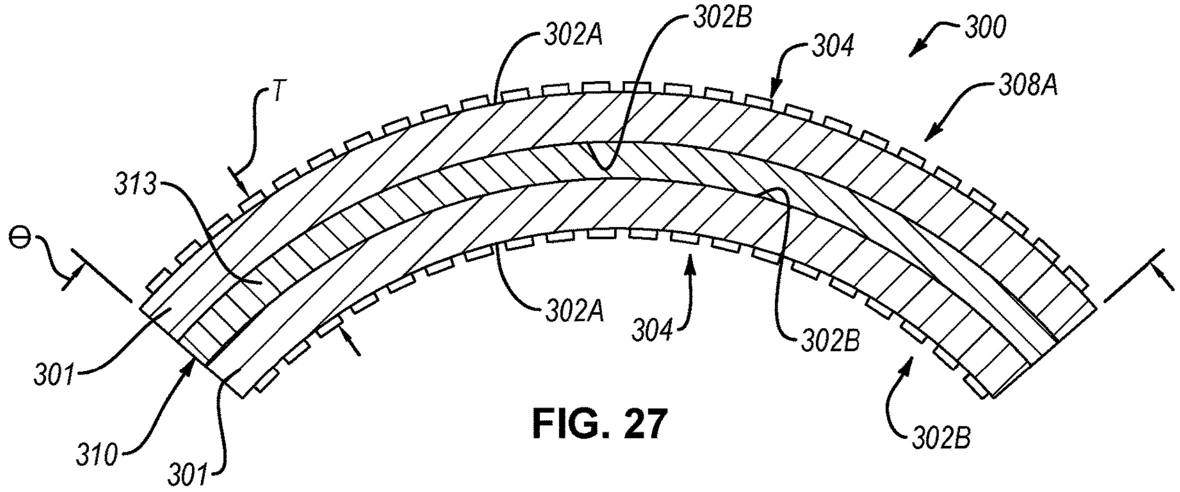
FIG. 27 illustrates a cross-sectional, front elevation view of a proximal end portion of a flexible circuit board, taken along the line 26-26 of FIG. 24, according to one or more examples of the present disclosure.

According to some examples, the arc of the arced end portion 308A of the flexible circuit board 300 is pre-formed prior to inserting the arced end portion 308A in between the arc-shaped rows of the plug electrical contacts 166. In other words, the arced end portion 308A holds its arced shape (e.g., is self-supporting, has a fixed arced shape, etc.) before being inserted into the gap between the arc-shaped rows of the plug electrical contacts 166. Referring to FIG. 27, according to one example, the arced end portion 308A holds its arced shape via a bonding layer 310. In the example of FIG. 27, the flexible circuit board 300 includes two flexible substrates 301 and the bonding layer 310 interposed between or sandwiched by the two flexible substrates 301. Accordingly, the bonding layer 310 is directly coupled to the second major surface 302B of one of the two flexible substrates 301 and to the first major surface 302A of the other one of the two flexible substrates 301. The bonding layer 310 is made of a material that is stiffer than that of the flexible substrates 301. In FIG. 27, the bonding layer 310 is made of a bonding agent 313, such as a glue, an epoxy, or a resin. According to one example, with the bonding agent 313 in a pre-cured state (e.g., a flowable state) and deposited between the flexible substrates 301, the arced end portion 308A is manipulated into its arced shape, such as by using a fixture, tool, or jig, and, while in the arced shape, the bonding agent 313 is cured (e.g., hardened) to fix the arced end portion 308A in the arced shape. Depending on the type of the bonding agent 313, the bonding agent 313 can be cured at room temperature or at a curing temperature above room temperature. In such an example, the total thickness T of the flexible circuit board 300, at a given location, is equal to the combined thicknesses of the two flexible substrates 301, the proximal electrical pads 304, and the bonding layer 310, at the given location.

Figure 28:
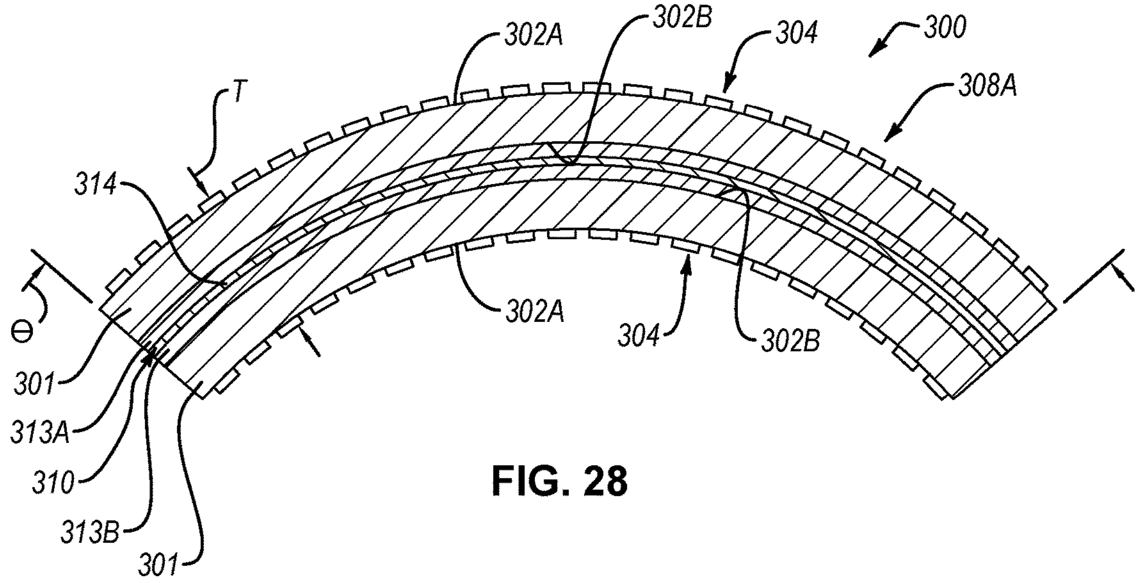
FIG. 28 illustrates a cross-sectional, front elevation view of a proximal end portion of a flexible circuit board, taken along the line 26-26 of FIG. 24, according to one or more examples of the present disclosure.

Referring to FIG. 28, according to another example, the flexible circuit board 300 includes two flexible substrates 301 and the bonding layer 310 is interposed between the two flexible substrates 301. Unlike the bonding layer 310 shown in FIG. 27, the bonding layer 310 of the flexible circuit board 300 of FIG. 28 further includes a stiffener 314 embedded in the bonding agent 313, or separating the bonding agent 313 into two layers (e.g., first layer 313A and second layer 313B). The stiffener 314 is configured to be stiffer than the bonding agent 313 after the bonding agent 313 is cured. In some examples, the stiffener 314 is a plate made of a material, such as metal, a fibrous material (e.g., paper), plastic, and the like, that is stiffer than the bonding agent 313 and the flexible substrates 301. According to one example, with the bonding agent 313 in a pre-cured state (e.g., a flowable state) and deposited between the flexible substrates 301, and with the stiffener 314 embedded in the bonding agent 313 or sandwiched between two layers of the bonding agent 313, the arced end portion 308A is manipulated into its arced shape, such as by using a fixture, tool, or jig, and, while in the arced shape, the bonding agent 313 is cured (e.g., hardened) to help fix the arced end portion 308A in the arced shape. Fixation of the arced end portion 308A in the arced shape is also helped by the non-elastic nature of the stiffener 314, which holds its shape after being formed into an arc shape or semi-circular shape. Alternatively, the stiffener 314 is pre-formed in the arc shape and the bonding agent 313 and flexible substrates 301 are applied onto the stiffener 314. The thickness of the stiffener 314 can be selected to achieve a desired thickness of the flexible circuit board 300.

Figure 32:
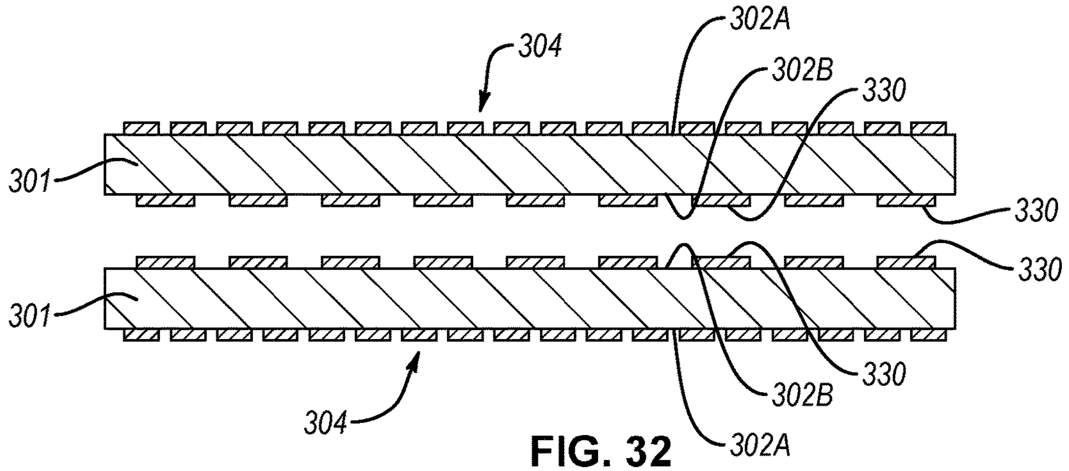
FIG. 32 illustrates a cross-sectional, front elevation view of flexible substrates of a flexible circuit board, taken along a line analogous to the line 26-26 of FIG. 24, according to one or more examples of the present disclosure.
Figure 33:
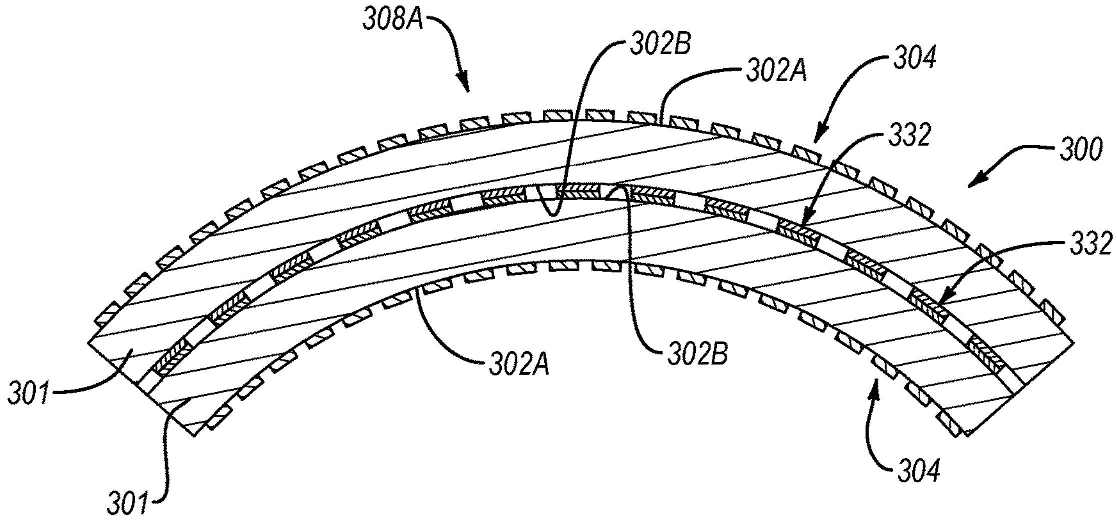
FIG. 33 illustrates a cross-sectional, front elevation view of a proximal end portion of a flexible circuit board, taken along the line 26-26 of FIG. 24, according to one or more examples of the present disclosure.

Referring to yet another example, as shown in FIGS. 32 and 33, the arc of the arced end portion 308A of the flexible circuit board 300 can be pre-formed by reflowing solder pads 330 applied to each one of two flexible substrates 301. Referring to FIG. 32, solder pads 330 are applied, in a spaced-apart manner, to the second major surface 302B of a first one of the two flexible substrates 301, such as when the first one of the two flexible substrates 301 is flat. Similarly, solder pads 330 are applied, in a spaced-apart manner, to the second major surface 302B of a second one of the two flexible substrates 301, such as when the second one of the two flexible substrates 301 is flat. The solder pads 330 can be made from any of various reflowable materials, such as solder paste, thermoplastic material, solder balls, and the like. The locations of the solder pads 330 on the flexible substrates 301 is such that when the second major surfaces 302B face each other and the flexible substrates 301 are manipulated into an arc shape (see, e.g., FIG. 33), each one of the solder pads 330 on the first one of the flexible substrates 301 is aligned with and contacts a corresponding one of the solder pads 330 on the second one of the flexible substrates 301. When the flexible substrates 301 are in the arc shape, such as via a fixture, and when the solder pads 330 are aligned and in contact, as shown in FIG. 33, the solder pads 330 are heated to a temperature greater than a reflow temperature of the reflowable material of the solder pads 330, and then allowed to cool. The reflow and cooling of the solder pads 330 bonds corresponding pairs of the solder pads 330 together to form bond joints 332. The bonding together of the solder pads 330 facilitates retention of the flexible substrates in the arc shape in preparation for inserting the flexible circuit board 300 between the plug electrical contacts 166.

Figure 29:
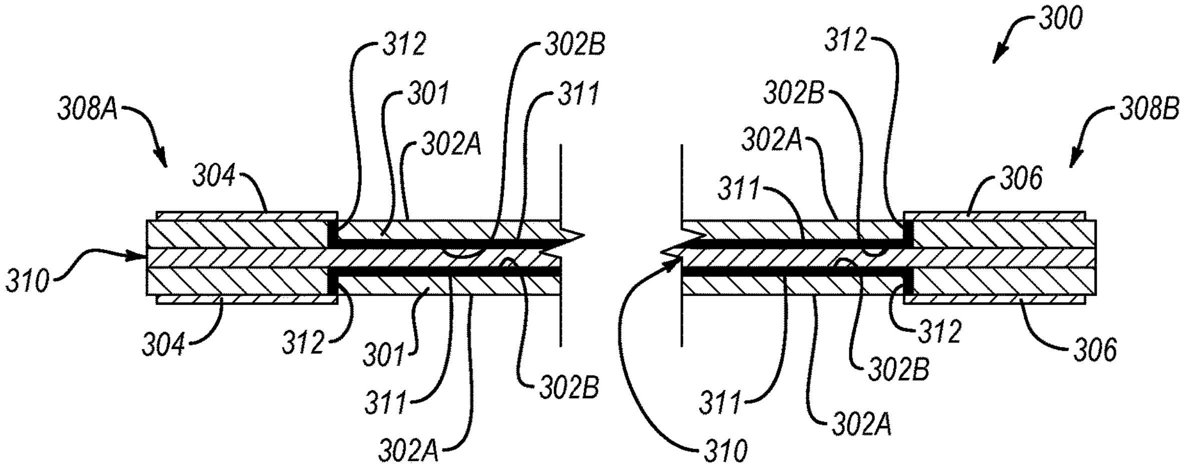
FIG. 29 illustrates a cross-sectional, side elevation view of a flexible circuit board, taken along the line 29-29 of FIG. 24, according to one or more examples of the present disclosure.

Referring to FIG. 29, according to some examples, the flexible circuit board 300 includes traces 311 and vias 312, which electrically couple together each one of the proximal electrical pads 304 with the corresponding one or more of the distal electrical pads 306. The traces 311 are embedded in the flexible circuit board 300 and each via 312 extends from one of the proximal electrical pads 304 or the distal electrical pads 306 to at least one of the traces 311. In the illustrated example of FIG. 29, the flexible circuit board 300 is similar to the flexible circuit board 300 of FIG. 27. More specifically, the flexible circuit board 300 includes two flexible substrates 301 and a bonding layer 310 interposed between the two flexible substrates 301. The flexible circuit board 300 includes a first set of electrical traces 311, which are interposed between the bonding layer 310 and the second major surface 302B of a first one of the flexible substrates 301, and a second set of electrical traces 311, which are interposed between the bonding layer 310 and the second major surface 302B of a second one of the flexible substrates 301. The arced end portion 308A includes a first set of vias 312 that extend through a thickness of the first one of the flexible substrates 301, to electrically couple the proximal electrical pads 304 on the first one of the flexible substrates 301 to the first set of electrical traces 311. Additionally, the arced end portion 308A includes a second set of vias 312 that extend through a thickness of the second one of the flexible substrates 301, to electrically couple the proximal electrical pads 304 on the second one of the flexible substrates to the second set of electrical traces 311. The flat end portion 308B includes a third set of vias 312 that extend through a thickness of the first one of the flexible substrates 301, to electrically couple the distal electrical pads 306 on the first one of the flexible substrates to the first set of electrical traces 311. Additionally, the flat end portion 308B includes a fourth set of vias 312 that extend through a thickness of the second one of the flexible substrates 301, to electrically couple the distal electrical pads 306 on the second one of the flexible substrates 301 to the second set of electrical traces 311.

The configuration of traces and vias of the flexible circuit board 300 of FIG. 29 enables the distal electrical pads 306 to be located on opposing sides and the distal end of the flexible circuit board 300. The distal electrical pads 306, being configured as dual-sided termination pads, promote compatibility of the flat end portion 308B with dual-sided printed circuit boards (PCB), dual-sided edge card sockets, dual-sided zero insertion force (ZIF) sockets, and the like.

Figure 30:
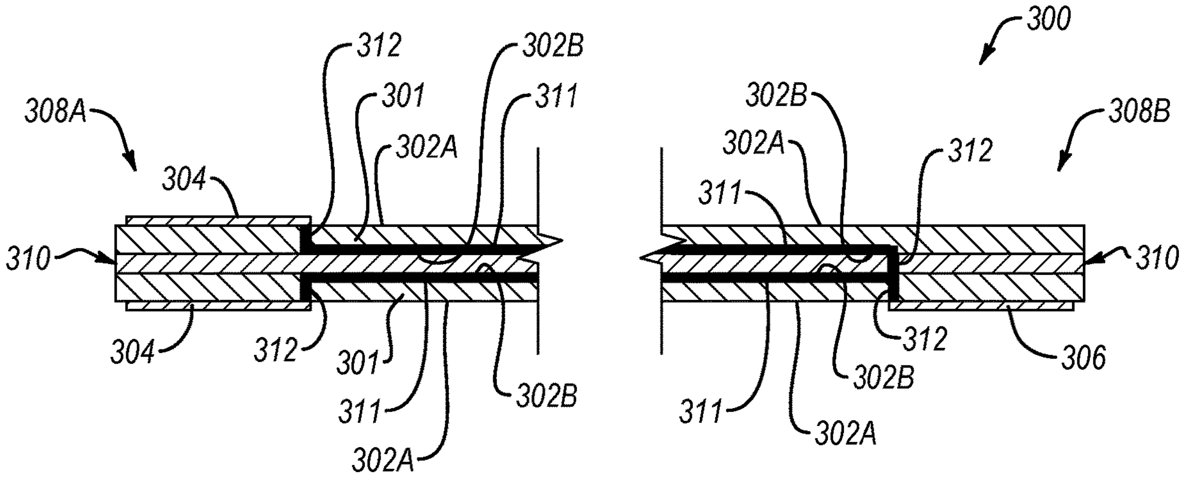
FIG. 30 illustrates a cross-sectional, side elevation view of a flexible circuit board, taken along the line 29-29 of FIG. 24, according to one or more examples of the present disclosure.

Unlike the flexible circuit board 300 of FIG. 29, which electrically couples together dual-sided initiation pads, at the proximal end, to dual-sided termination pads, at the distal end, the flexible circuit board 300 of FIG. 30 is configured to electrically couple together dual-sided initiation pads, at the proximal end, to single-sided termination pads, at the distal end. More specifically, at the flat end portion 308B, the distal electrical pads 306 are located on only one side of the flexible circuit board 300. Accordingly, the traces 311 that are electrically coupled to the proximal electrical pads 304 on the side of the flexible circuit board 300, opposite the side that the distal electrical pads 306 are located, are electrically coupled to the distal electrical pads 306 by vias 312 that extend through a thickness of the bonding layer 310 and extend through a thickness of the flexible substrate 301 on which the distal electrical pads 306 are located. The distal electrical pads 306, being configured as single-sided termination pads, promote compatibility of the flat end portion 308B with single-sided PCBs, single-sided edge card sockets, single-sided ZIF sockets, and the like.

Figure 31:
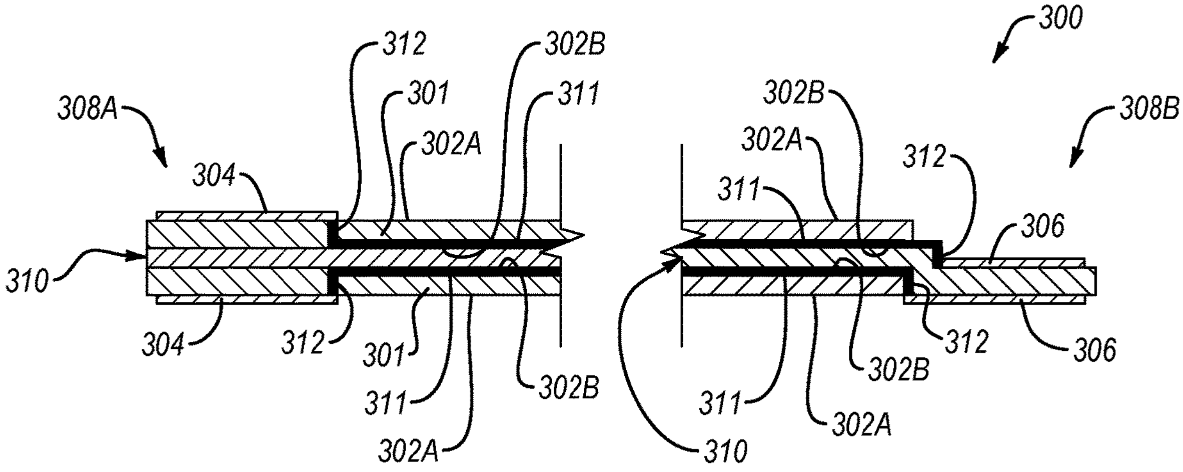
FIG. 31 illustrates a cross-sectional, side elevation view of a flexible circuit board, taken along the line 29-29 of FIG. 24, according to one or more examples of the present disclosure.

Referring to FIG. 31, according to some examples, the flexible circuit board 300 is configured in a manner similar to that of FIG. 29 to enable compatibility of the flat end portion 308B with dual-sided PCBs, dual-sided edge card sockets, dual-sided ZIF sockets, and the like. However, the flat end portion 308B of the flexible circuit board 300 is specifically configured to be compatible with thinner PCBs, dual-sided edge card sockets, dual-sided ZIF sockets, etc. In other words, the flat end portion 308B of the flexible circuit board 300 of FIG. 31, at the distal end, is thinner than the flat end portion 308B of the flexible circuit board 300 of FIG. 29, at the distal end. The thinner proximal end is accomplished by distally extending a second one of the flexible substrates 301 further than a first one of the flexible substrates 301. The distal electrical pads 306 are located on opposite sides of the second one of the flexible substrates 301. More specifically, one set of distal electrical pads 306 are on a first side of the second one of the flexible substrates 301 that faces the first one of the flexible substrates 301, and the other set of distal electrical pads 306 are on a second side of the second one of the flexible substrates 301 that faces away from the first one of the flexible substrates 301. Accordingly, the traces 311 that are electrically coupled to the proximal electrical pads 304 on the first one of the flexible substrates 301 are electrically coupled to the distal electrical pads 306, on the first side of the second one of the flexible substrates 301, by vias 312 that extend through a thickness of the bonding layer 310.

Each one of the electrical contacts of the plug 102 and the receptacle 104 forms part of one or more electrical circuits. The electrical circuits have an inherent impedance value. Moreover, the impedance value of an electrical circuit can be incorporated into the design of the electrical circuit such that the electrical circuit has a desired impedance value. In some examples, such as where multiple electrical circuits are located in close proximity, particularly electrical circuits transmitting high frequency signals, matching the impedance of electrical circuits is desired. Because the impedance of electrical circuits in close proximity to each other is at least partially dependent on the thickness of the dielectric between the electrical circuits, the thickness of the dielectric is often engineered for impedance matching. Engineering or redesigning a dielectric based on changes to electrical circuits can be difficult, costly, and time-consuming.

Figure 34:
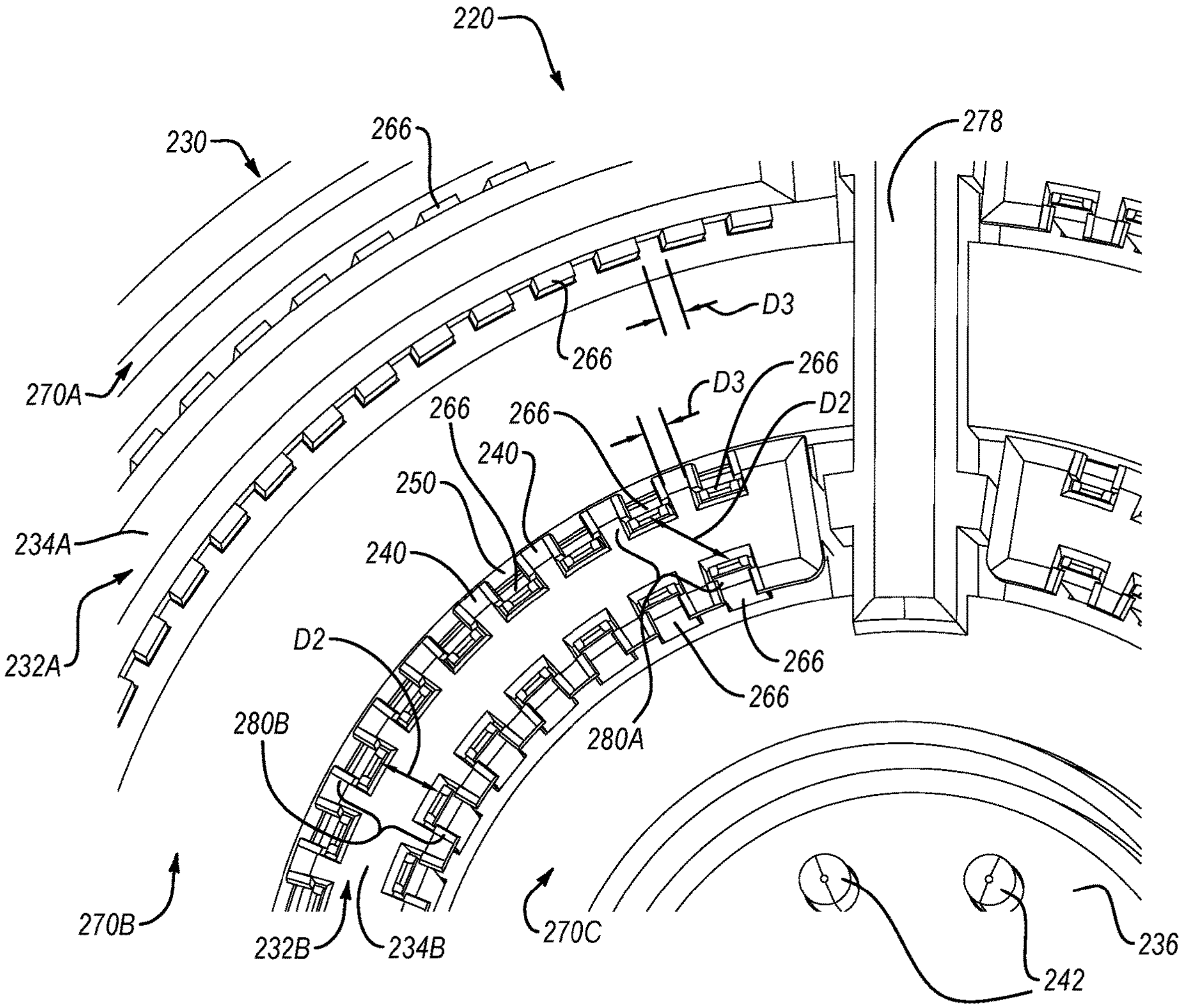
FIG. 34 illustrates a front elevation view of receptacle contact carrier, according to one or more examples of the present disclosure.

The plug 102 and the receptacle 104 of the present disclosure promote impedance matching without requiring engineering or redesigning of a dielectric. For example, as shown in FIG. 34 and in association with the receptacle 104 (the concepts being equally applicable to the plug 102), the receptacle electrical contacts 266 can be grouped into pairings (e.g., a first contact pairing 280A and a second contact pairing 280B) based on a thickness of the ring segment (e.g., D2) between the paired electrical contacts. Because the impedance matching of two electrical circuits is responsive to the thickness of the ring segment, desired impedance matching between electrical circuits can be accomplished by pairing the receptacle electrical contacts 266 that are separated by a thickness that corresponds with the desired impedance matching. In this manner, impedance matching is achieved with flexibility by selecting receptacle electrical contacts 222 that are separated by a desired thickness of the ring segment, rather than redesigning and remaking the ring segment. Although, in the illustrated examples, the distance D3 between circumferentially adjacent receptacle electrical contacts 222 is the same for all the receptacle electrical contacts 222 of a given ring-segment assembly, in other examples, the distance D3 can vary.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An electrical connector, comprising:

a plug, comprising:

a plug frame, comprising plug apertures circumferentially spaced apart from each other and having an first arc shape; and plug ring-segment assemblies, circumferentially spaced relative to each other and each attached to the plug frame within a corresponding one of the plug apertures, wherein each one of the plug ring-segment assemblies comprises a plug ring-segment, having a second arc shape, and a plurality of plug electrical contacts, electrically isolated from each other, passing through the plug ring-segment, and arranged in a third arc shape; and a receptacle, comprising:

a receptacle frame, comprising receptacle apertures circumferentially spaced apart from each other and having a fourth arc shape; and receptacle ring-segment assemblies, circumferentially spaced relative to each other and each attached to the receptacle frame within a corresponding one of the receptacle apertures, wherein each one of the receptacle ring-segment assemblies comprises a receptacle ring-segment, having a fifth arc shape, and a plurality of receptacle electrical contacts, electrically isolated from each other, passing through the receptacle ring-segment, and arranged in a sixth arc shape, wherein:

the plug is selectively connectable with the receptacle; and when the plug is selectively connected with the receptacle, each one of at least some of the plug electrical contacts is in physical contact with a corresponding one of the receptacle electrical contacts.

2. The electrical connector of claim 1, wherein one of:

a first end of each one of the at least some of the plug electrical contacts is allowed to flex radially in an inward radial direction with respect to a second end of the corresponding one of the at least some of the plug electrical contacts, and the receptacle electrical contacts are prevented from flexing radially in the inward radial direction; or a first end of each one of the at least some of the receptacle electrical contacts is allowed to flex radially in the inward radial direction with respect to a second end of the corresponding one of the at least some of the receptacle electrical contacts, and the plug electrical contacts are prevented from flexing radially in the inward radial direction.

3. The electrical connector of claim 1, wherein one of:

at least one of the plurality of receptacle electrical contacts is radially movable and away from a central axis of the plug; or at least one of the plurality of receptacle electrical contacts is radially movable toward and away from a central axis of the receptacle.

4. The electrical connector of claim 1, further comprising:

first flexible electrical circuit boards each comprising a first end in electrical contact with at least one of the plug electrical contacts of a corresponding one of the plug ring-segment assemblies; and second flexible electrical circuit boards each comprising a first end in electrical contact with at least one of the receptacle electrical contacts of a corresponding one of the receptacle ring-segment assemblies.

5. The electrical connector of claim 4, wherein:

the first end of each one of the first flexible electrical circuit boards in electrical contact with at least one of the plug electrical contacts is arced;

each one of the first flexible electrical circuit boards in electrical contact with at least one of the plug electrical contacts comprises a second end that is opposite the first end and is flat;

the first end of each one of the second flexible electrical circuit boards in electrical contact with at least one of the receptacle electrical contacts is arced; and each one of the second flexible electrical circuit boards in electrical contact with at least one of the receptacle electrical contacts comprises a second end that is opposite the first end, of the second flexible circuit board, and is flat.

6. The electrical connector of claim 1, wherein:

any one of the plug ring-segment assemblies is attachable to the plug frame within the corresponding one of the plug apertures independently of attachment of any other one of the plug ring-segment assemblies to the plug frame within the corresponding one of the plug apertures; and any one of the receptacle ring-segment assemblies is attachable to the receptacle frame within the corresponding one of the receptacle apertures independently of attachment of any other one of the receptacle ring-segment assemblies to the receptacle frame within the corresponding one of the receptacle apertures.

7. A plug of an electrical connector, the plug comprising:

a plug frame, comprising apertures circumferentially spaced apart from each other and having a first arc shape, wherein each of the apertures are concentric relative to each other and to a central axis of the plug frame; and ring-segment assemblies, circumferentially spaced relative to each other and each attached to the plug frame within a corresponding one of the apertures, wherein each one of the ring-segment assemblies comprises a ring-segment, having a second arc shape, and a plurality of plug electrical contacts, electrically isolated from each other, passing through the ring-segment, and arranged in a third arc shape.

8. The plug of claim 7, wherein:

the plug frame comprises plug-frame ribs and plug-frame slots adjacent to the apertures;

each ring-segment assembly comprises ring-segment ribs and ring-segment slots; and each of the ring-segment ribs and the ring-segment slots are aligned with a corresponding one of the plug-frame ribs and the plug-frame slots, respectively.

9. The plug of claim 8, wherein:

each one of the plug electrical contacts is radially movable within a corresponding one of the plug-frame slots and radially movable within a corresponding one of the ring-segment slots with respect to a central axis of the plug frame; and each one of the plug electrical contacts is prevented from lateral movement within the corresponding one of the plug-frame slots and the corresponding one of the ring-segment slots with respect to the central axis of the plug frame.

10. The plug of claim 7, wherein:

the plug frame further comprises an outer ring, a middle ring, radially inwardly spaced apart from the outer ring, and an inner ring, radially inwardly spaced apart from the middle ring;

the outer ring, the middle ring, the inner ring, and the apertures are concentric; and each one of the apertures is defined by a space either between the outer ring and the middle ring, or between the middle ring and the inner ring.

11. The plug of claim 10, wherein:

at least two of the apertures are defined by the space between the outer ring and the middle ring; and at least two of the apertures are defined by the space between the middle ring and the inner ring.

12. The plug of claim 11, wherein the plug frame further comprises spokes extending radially away from a central axis of the plug frame and coupling together the outer ring, the middle ring, and the inner ring.

13. The plug of claim 12, wherein each one of the apertures is defined between a corresponding two of the spokes.

14. The plug of claim 7, further comprising flexible electrical circuit boards each comprising a first end in electrical contact with at least one of the plug electrical contacts of a corresponding one of the ring-segment assemblies, wherein:

the first end of each one of the flexible electrical circuit boards in electrical contact with at least one of the plug electrical contacts is arced; and each one of the flexible electrical circuit boards in electrical contact with at least one of the plug electrical contacts comprises a second end that is opposite the first end and is flat.

15. A receptacle of an electrical connector, the receptacle comprising:

a receptacle frame, comprising apertures circumferentially spaced apart from each other and having a first arc shape, wherein each of the apertures are concentric relative to each other and to a central axis of the receptacle frame; and ring-segment assemblies, circumferentially spaced relative to each other and each attached to the receptacle frame within a corresponding one of the apertures, wherein each one of the ring-segment assemblies comprises a ring-segment, having a second arc shape, and a plurality of receptacle electrical contacts, electrically isolated from each other, passing through the ring-segment, and arranged in a third arc shape.

16. The receptacle of claim 15, further comprising flexible electrical circuit boards each comprising a first end in electrical contact with at least one of the receptacle electrical contacts of a corresponding one of the ring-segment assemblies, wherein:

the first end of each one of the flexible electrical circuit boards in electrical contact with at least one of the receptacle electrical contacts is arced; and each one of the flexible electrical circuit boards in electrical contact with at least one of the receptacle electrical contacts comprises a second end that is opposite the first end and is flat.

17. The receptacle of claim 15, wherein:

the receptacle frame further comprises an outer ring, a middle ring, radially inwardly spaced apart from the outer ring, and an inner ring, radially inwardly spaced apart from the middle ring;

the outer ring, the middle ring, the inner ring, and the apertures are concentric; and each one of the apertures is defined by a space either between the outer ring and the middle ring, or between the middle ring and the inner ring.

18. The receptacle of claim 17, wherein:

at least two of the apertures are defined by the space between the outer ring and the middle ring; and at least two of the apertures are defined by the space between the middle ring and the inner ring.

19. The receptacle of claim 18, wherein the receptacle frame further comprises spokes extending radially away from a central axis of the receptacle frame and coupling together the outer ring, the middle ring, and the inner ring.

20. The receptacle of claim 19, wherein each one of the apertures is defined between a corresponding two of the spokes.

* * * * *